US008958269B2

(12) United States Patent
LaWhite et al.

(10) Patent No.: US 8,958,269 B2
(45) Date of Patent: Feb. 17, 2015

(54) TRANSDUCER FOR PHASED ARRAY ACOUSTIC SYSTEMS

(75) Inventors: Niels LaWhite, Somerville, MA (US); Andrew Hastings-Black, Medford, MA (US); Louis Manfredi, Hull, MA (US); Michael Jobin, Boston, MA (US); Walter L. Sass, Somerville, MA (US)

(73) Assignee: Vaisala, Inc., Louisville, CO (US)

( * ) Notice: Subject to any disclaimer, the term of this patent is extended or adjusted under 35 U.S.C. 154(b) by 343 days.

(21) Appl. No.: 13/475,585

(22) Filed: May 18, 2012

(65) Prior Publication Data

US 2012/0294121 A1 Nov. 22, 2012

Related U.S. Application Data

(60) Provisional application No. 61/488,376, filed on May 20, 2011.

(51) Int. Cl.
*G01S 15/00* (2006.01)
*H04R 1/02* (2006.01)
*H04R 1/30* (2006.01)
*H04R 1/28* (2006.01)
(Continued)

(52) U.S. Cl.
CPC .............. *H04R 1/30* (2013.01); *H04R 1/2811* (2013.01); *G01S 7/521* (2013.01); *H04R 1/403* (2013.01); *H04R 2201/401* (2013.01); *G01S 15/885* (2013.01)
USPC ....................................... 367/138

(58) Field of Classification Search
CPC .. H04R 1/2811; H04R 1/30; H04R 2201/401; H04R 1/403; G01S 7/521; G01S 15/885
USPC ................................. 367/140, 138
See application file for complete search history.

(56) References Cited

U.S. PATENT DOCUMENTS 3,866,710 A 2/1975 Cesati
4,181,193 A 1/1980 Isaac
(Continued)

FOREIGN PATENT DOCUMENTS

WO WO 2012162170 A1 * 11/2012

OTHER PUBLICATIONS

Werkhoven et al., "The Design of Acoustic Radar Baffles", Journal of Atmospheric and Oceanic Technology, vol. 14, 1997, American Meteorological Society, [retrieved on Aug. 20, 2012], Retrieved from the Internet: <URL:http://journals.ametsoc.org/doi/pdf/10.1175/1520-0426(1997)014%3C0360%3ATDOARB%3E2.0.CO%3B2>, pp. 360-367.

(Continued)

*Primary Examiner* — Daniel Pihulic
(74) *Attorney, Agent, or Firm* — Maschoff Brennan

(57) ABSTRACT

A transducer includes a base, a horn, and a central element. The horn includes a first end coupled to the base and a second end extending from the base and having a perimeter that defines a substantially planar face of the transducer, the horn defining a horn length along a horn surface between the first end and the second end of the horn. The central element includes a first end coupled to the base and a second end extending from the base along a longitudinal axis of the horn, the central element defining a central element length along a central element surface between the first end and the second end of the central element, the central element length being substantially equal to the horn length.

21 Claims, 30 Drawing Sheets

(51) Int. Cl.
   *G01S 7/521* (2006.01)
   *H04R 1/40* (2006.01)
   *G01S 15/88* (2006.01)

(56) References Cited

U.S. PATENT DOCUMENTS

| | | |
|---|---|---|
| 6,557,664 B1 | 5/2003 | Andrews et al. |
| 7,837,006 B1 | 11/2010 | Graber |
| 2005/0135647 A1 | 6/2005 | Lin |
| 2007/0036382 A1 | 2/2007 | Gladwin et al. |
| 2009/0034779 A1 | 2/2009 | Xi |
| 2010/0195443 A1 | 8/2010 | LaWhite et al. |
| 2012/0294121 A1* | 11/2012 | LaWhite et al. ............ 367/140 |

OTHER PUBLICATIONS

International Preliminary Report on Patentability issued in corresponding PCT Application No. PCT/US2012/038645.

* cited by examiner

TRANSDUCER FOR PHASED ARRAY ACOUSTIC SYSTEMS

RELATED APPLICATIONS

This patent application claims the benefit of U.S. Patent Application No. 61/488,376 filed on May 20, 2011, entitled, "Transducer for Phased Array Acoustic Systems," the contents and teachings of which are hereby incorporated by reference in their entirety.

BACKGROUND

Conventional sodar systems employ directed sound waves to detect atmospheric phenomena such as wind speed. By directing sound beams into the atmosphere in a number of directions and measuring the Doppler shift of echoes returned from turbulence and thermal variations in the atmosphere, wind speed and other atmospheric phenomena can be accurately estimated.

The predominant type of sodar system in current use is the monostatic phased array sodar system. Monostatic sodar emanates sound beams and detect sound beam reflections from a single location. Phased array monostatic sodars direct the beams in different directions, and are sensitive to echoes returned from these directions, by use of an array of sound transducers. These transducers are configured to transmit and receive in groups of differing phase so as to direct the transmitted sound beams and regions of sensitivity, as desired.

SUMMARY

An example of a conventional transducer used in a monostatic phased array sodar system is illustrated in FIGS. 1A and 1B. The transducer 10 includes a horn assembly 105 that is coupled to a rear cap 107 via fasteners such as screws. The inside surface S of the horn assembly 105 includes geometric features 111 configured to distribute the sound emitted by the transducer in a minimally directional pattern. The transducer 10 also includes a connector 110 mounted on printed circuit board 109 configured to electrically connect the transducer 10 to electronic equipment associated with the sodar system.

Transducers, such as those used in conventional monostatic phased array sodar system however, suffer from a variety of deficiencies. Conventional transducers used in sodar systems have typically been adapted from other applications. In one arrangement, horn type piezoelectric audio tweeters are used as transducers in sodar systems and operate at frequencies of approximately four to five kilohertz. However, these transducers have a number of characteristics detrimental to their performance in phased array applications.

Conventional transducers optimized for audio use are designed to operate in a substantially non-directional manner as to contribute to an audio speaker system which can be listened to comfortably in the widest possible range of positions. By contrast, phased array sodar systems are typically configured to transmit sound in directions up to approximately 15 degrees from an axis perpendicular to the plane of the transducer array. There is no benefit to having the transducer emit significant energy beyond this range and such emission can, in fact, detract from the performance of the phased array system by contributing to parasitic transmission energy and reception sensitivity at angles near to perpendicular to the intended beam direction.

Additionally, conventional transducers optimized for audio use are designed to have a resonant frequency outside of the frequency range of operation or to be configured with a highly damped design having a weak peak at its resonant frequency in order to most faithfully reproduce the varying frequencies present in a music signal with consistent intensity over the range of frequencies. By contrast, phased array apparatus typically are intended to operate over a fairly narrow range of sound frequencies or wavelengths.

Furthermore, measurement of emission phase over the face of a conventional transducer demonstrates that the transducer can have extreme variation in phase over its face. The reason for the phase variation in sound arriving at the varying positions on the surface of a conventional transducer will be apparent by observing the path followed by the sound energy to get to these varying positions. For example, FIG. 1C shows a cross section of the conventional transducer 10. The transducer 10 consists of a vibrating membrane dividing a substantially enclosed chamber into two cavities. One cavity 116, the back side, is completely closed and does not emit sound energy into the environment. The second cavity 108 has small openings which open into the narrow end of the horn 105. Moving from the narrow end to the outlet of the transducer 10, the cross section of horn cavity gradually expands to an opening of the full size of the transducer face. A common geometry is developed from an exponential increase in cross section area as the open, emitting, face of the transducer 10 is reached. This gradual increase in cross section tends to efficiently couple the sound energy from the constrained enclosure where it is generated to the unconstrained free air environment.

Sound arriving at the center of the transducer 10 follows a straight path 113 from the narrow end of the horn to the center of the open face F. Sound arriving near the perimeter of the transducer horn follows a significantly longer path 112 approximately following the curve of the wall of the horn 105. The speed of sound is constant in free air at a given temperature. As a result, the wavefront of sound arrives at the exit plane of the transducer at the center of the horn considerably sooner than the wavefront arrives near the outer perimeter of the horn. Since sound travels at the same velocity over both paths, the wavefront emitted from transducer 10 will be substantially non-uniform in phase over the emitting planar face F of the transducer 10.

By contrast, a phased array apparatus operate optimally when the phase of the sound emitted from the surface of the array varies continuously and linearly with position measured along a first axis on the surface of the array that is a projection of the beam main transmission axis onto the plane at the surface of the array and is uniform measured along the axis perpendicular to this first axis. This condition maximizes the energy transmitted and reception sensitivity in the desired beam direction and minimizes emission energy and reception sensitivity in undesired directions. As a practical matter, for a phased array system which can operate in a number of different beam directions, this condition is best approximated when the sound emission from each of the individual transducers in the phased array emits sound of the most uniform possible phase over the surface of that individual transducer.

By contrast to conventional transducers, embodiments of the innovation relate to a transducer for phased array acoustic systems. In one arrangement, the transducer includes a central component configured to interrupt the conventional straight path to the center of the exit plane. The outer shape of the horn is also configured to accommodate the geometry of the central component. Accordingly, while the open cross sectional area of the transducer remains exponential, rather than having a series of annular sections increasing in outside diameter as found in conventional transducers, it includes a series of annular sections of increasing mean diameter and increasing total area such that the open cross sectional area of the horn increases exponentially. As a result, the distance travelled by sound going to the perimeter of the horn is substantially equal to the distance travelled by sound arriving near the center of the horn. The wavefront of sound arriving at the face of the transducer horn is substantially uniform in phase which improves the performance of the phased array apparatus.

In one arrangement, the transducer is configured with a resonant frequency near the operating frequency to provide a relatively greater efficiency in transmitting sound and a relatively higher sensitivity in reception of sound than conventional transducers. In one arrangement, the central component is supported by a support structure which does not significantly impede the propagation of sound through the annular section between the central component and the external portion of the horn. In one arrangement the support structure is configured as three spoke-like elements which are thin enough to not significantly affect the sound propagation. The purpose of these elements is to support the central component while minimizing the effect on the acoustic properties of the transducer.

In one arrangement, transmission of focused sound beams by an array equipped with the transducers as described above will be matched by similar and corresponding improvements in the directionality of reception sensitivity and attenuation of off-axis spurious reception when the array is operated as a phased array directional sound receiver.

While the transducer is described in detail in the context of sodar apparatus, it should be noted that similar, or even identical, transducers incorporating the innovative features may be used in order to improve performance of phased arrays in other applications, such as directional audio systems that are known in the art.

In one arrangement, a transducer includes a base, a horn, and a central element. The horn includes a first end coupled to the base and a second end extending from the base and having a perimeter that defines a substantially planar face of the transducer, the horn defining a horn length along a horn surface between the first end and the second end of the horn. The central element includes a first end coupled to the base and a second end extending from the base along a longitudinal axis of the horn, the central element defining a central element length along a central element surface between the first end and the second end of the central element, the central element length being substantially equal to the horn length.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

A transducer includes a horn and a central component configured to interrupt a sound path from a center of the transducer to an exit plane. The outer shape of the horn is also configured to accommodate the geometry of the central component. Accordingly, while the open cross sectional area of the transducer remains exponential, it includes a series of annular sections of increasing mean diameter and increasing total area such that the open cross sectional area of the horn increases exponentially. As a result, the distance travelled by sound going to the perimeter of the horn is substantially equal to the distance travelled by sound arriving near the center of the horn. The phase of the wavefront arriving at the face of the transducer horn is substantially uniform, which improves the performance of the phased array apparatus.

Figure 2A:
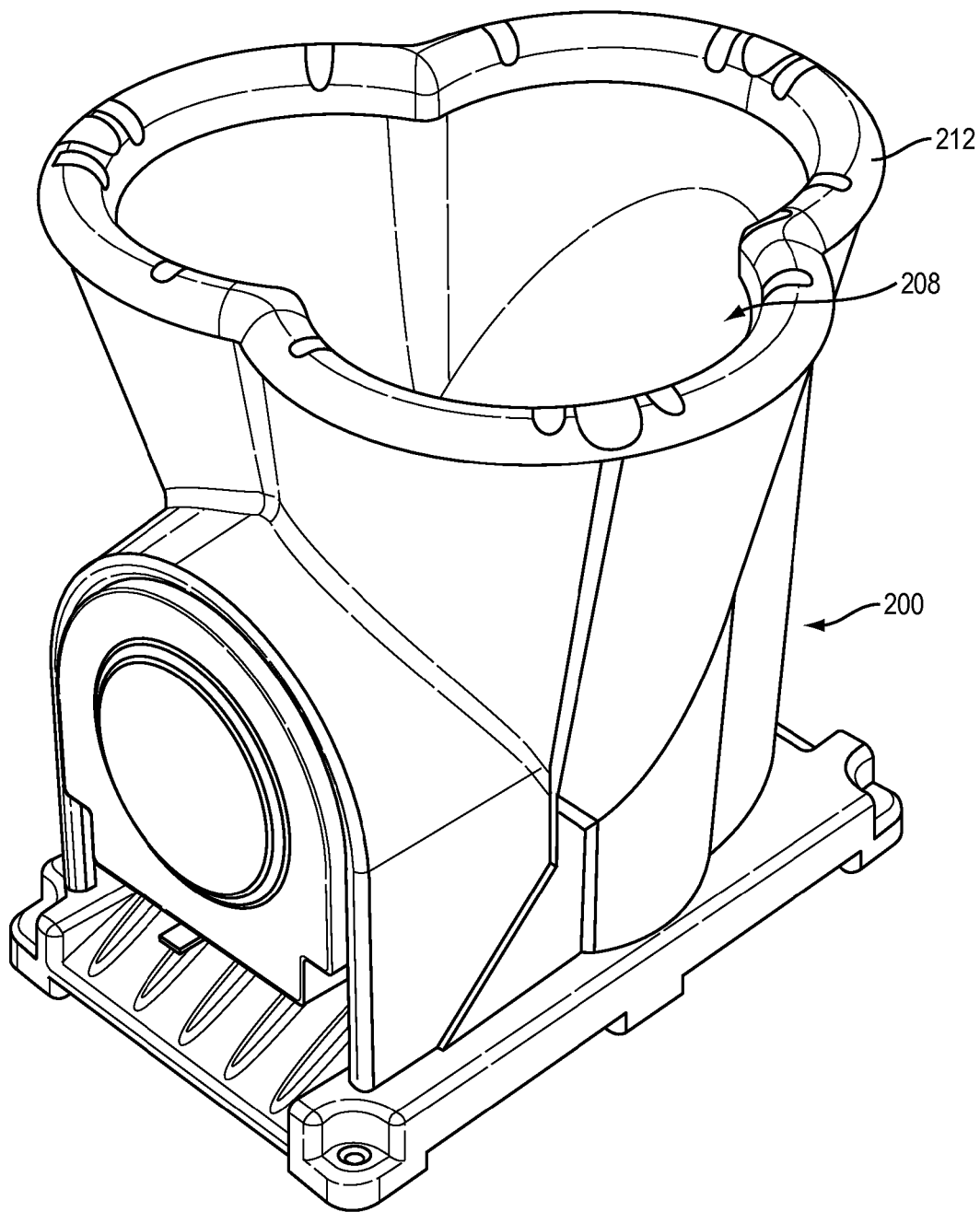
FIG. 2A illustrates a perspective view of a sodar apparatus having an array of transducers.
Figure 2B:
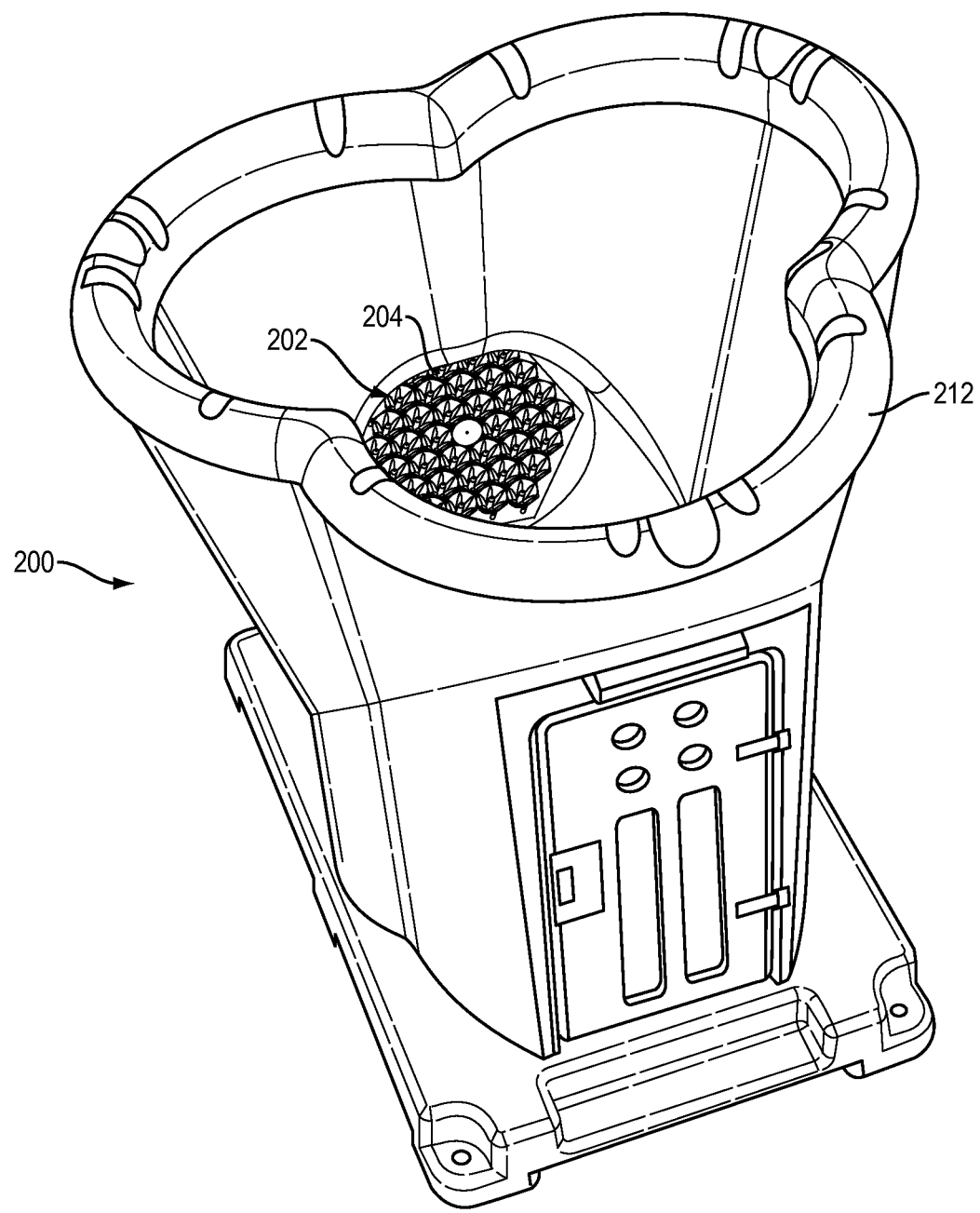
FIG. 2B is a second perspective view of the sodar apparatus of FIG. 2A.
Figure 2C:
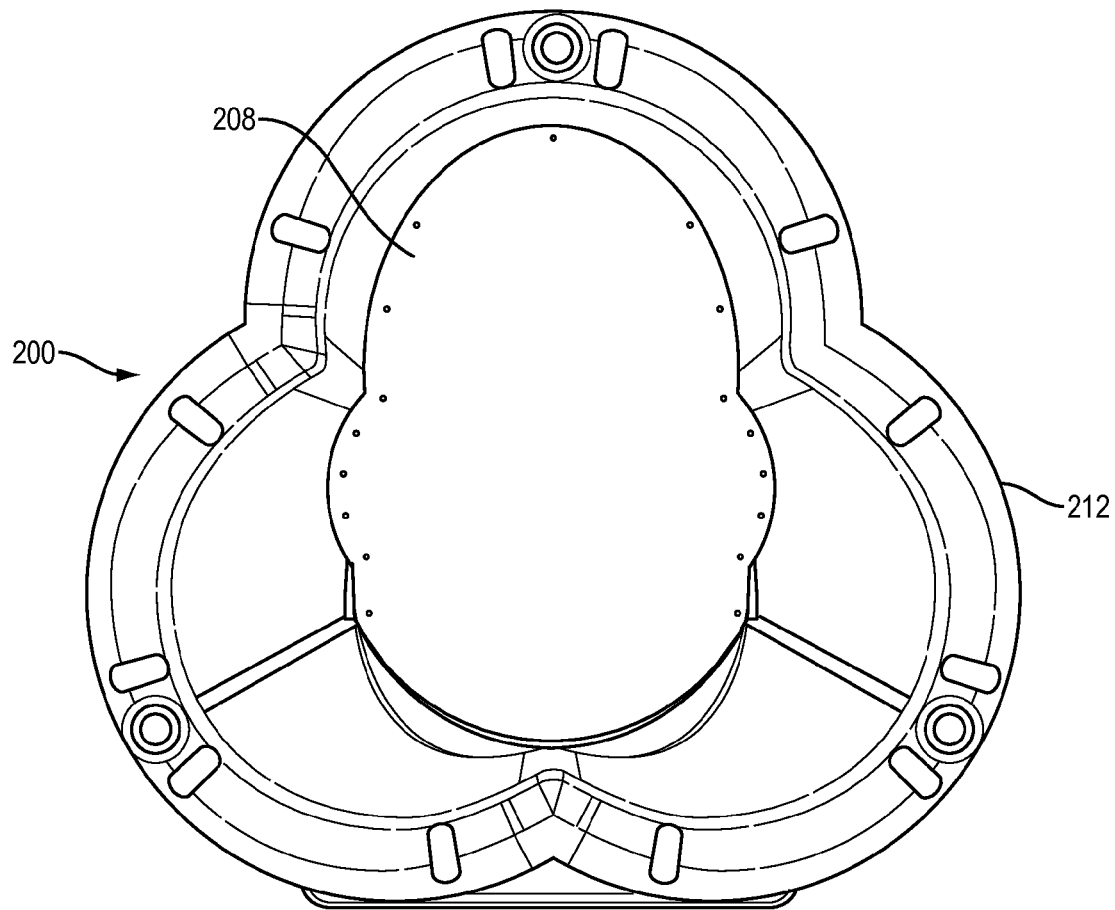
FIG. 2C is a top view of the sodar apparatus of FIG. 2A.
Figure 2D:
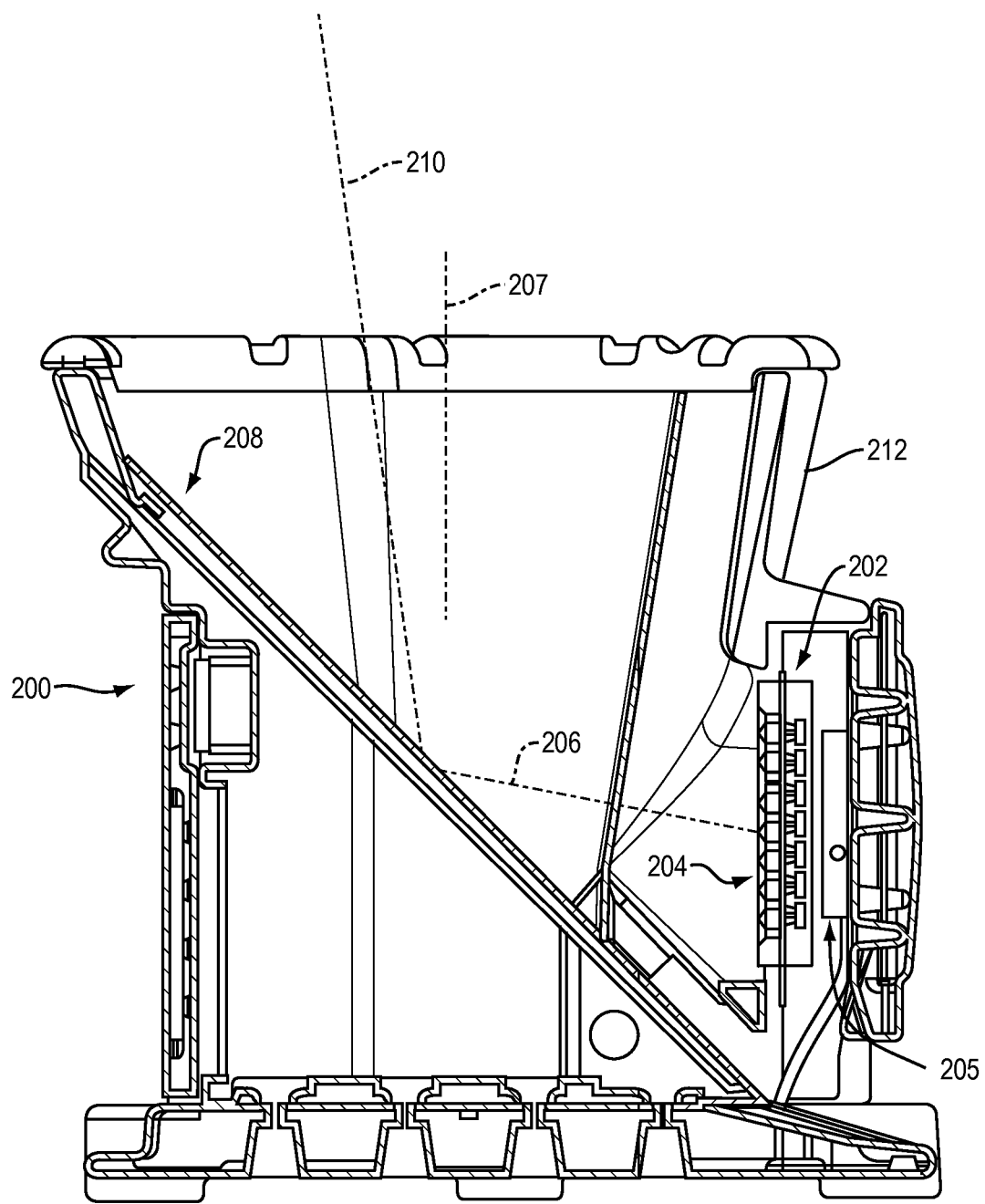
FIG. 2D is a sectional side view of the sodar apparatus of FIG. 2A.

FIGS. 2A through 2D illustrate an arrangement of a phased array monostatic sodar apparatus 200 having an array 202 of individual acoustic transducers 204. The transducers 10 are disposed in electrical communication with an electronics and data processing system 205 configured to drive the transducers 204 to emit phased array beams of sound 206 in the generally horizontal direction, as shown in FIG. 2D. These beams 206 impinge upon a solid smooth surface, termed a sound mirror or mirror 208 which cause the sound beams 206 to be reflected generally upwards as reflected beams 210.

The reflected sound beams 210 impinge upon turbulence and thermal variations in the atmosphere above. Some of the sound energy from these beams is reflected back along the same paths as outbound beams 210 and 206, returning to the transducers 204 in phased array 202 where they are detected by receiving components of the electronics package 205. These components 205 are mounted in housing 212 which supports the various components and which may also serve to block stray sound transmission and reception from undesired directions.

In order for a sodar apparatus 200 to measure wind speed and direction in the presence of precipitation, the housing is configured to protect the array 202 of transducers 204 from any precipitation which might permanently damage them or temporarily interfere with their operation. It should be noted that the arrangement described above wherein the array 202 is protected from the elements by housing 212, and in which mirror 208 is used to reflect the sound beams from the generally horizontal path 206 in which they are emitted from the array into the generally vertical path 210, is provided by way of example only. The array 202 can be protected from damage due to precipitation in a variety of ways.

Figure 2E:
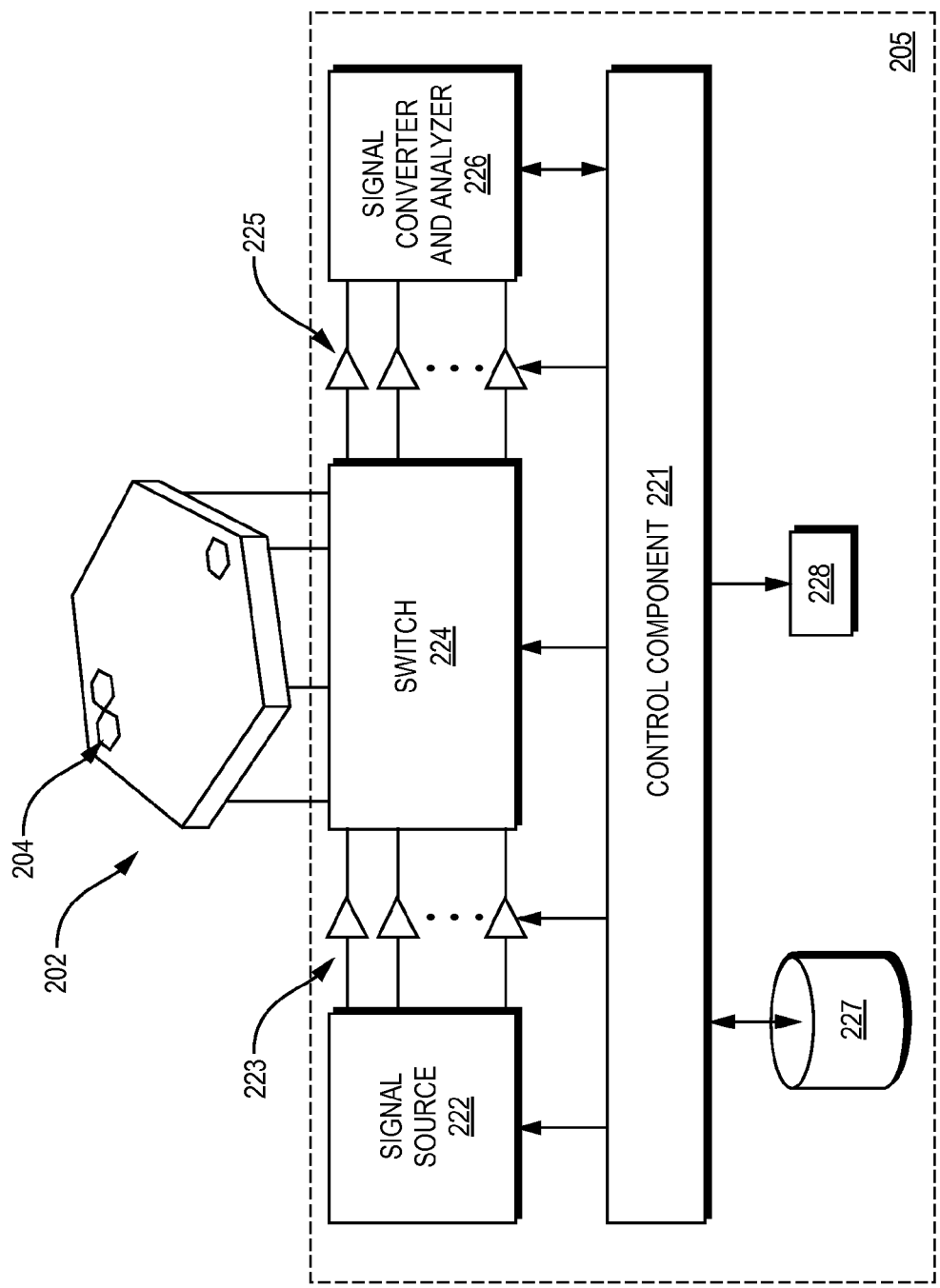
FIG. 2E is a schematic diagram of an electronic apparatus of the sodar apparatus of FIG. 2A.

The transducers 204 in the array 100 are driven by the electronics package 205 in a transmit mode and are detected and evaluated by the electronics package 205 in a receive mode. FIG. 2E shows a schematic representation of the electronics package 205, in one arrangement. During operation, the electronics package 205 operates, alternately, as a transmitter and a receiver. For example, in an initial period the electronics package 205 is configured to transmit a sound signal into the air, and in a second period immediately following the first period, the electronics package 205 is configured to receive, analyze, and record incoming signals, in particular the echoes of the transmitted signal reflected back from the environment.

The components of the electronics package 205 shown in FIG. 2E consist of hardware and software elements the function of which can be implemented in a variety of ways. For example, the elements can be configured as physical electronic hardware, controllers and/or signal processing computers configured to perform signal transmission and reception, or, a combination of the two.

In one arrangement, a control component 221, such as a processor and memory, configures a switch, such as a multi pole switch or switching network 224 to connect transducers 204 of array 202 to a signal source 222 through transmit amplifiers 223. The signal source 222 provides signals appropriately phased for each of the transducers 204 to cause array 202 to transmit a focused beam of sound 210 (FIG. 2D) in a particular generally upward direction. Immediately following this transmission, the control component 221 configures the switching network 224 to connect the transducers 204 of array 202 to a signal conversion and analysis component 226 through receive amplifiers 225. This receive mode configuration is set, using phased array techniques, to maximize sensitivity in the same direction as that in which beam 210 (FIG. 2D) was transmitted. Signal converter and analyzer 226 analyzes the spectral properties of the returned echoes in order to estimate atmospheric properties at various altitudes above the apparatus 200, as will be further described below. After the received data is analyzed, the electronics package 205 can store the information using a storage element 227 and/or can transmit, report, or display the received data for a user using a reporting component 228.

The apparatus 200 is primarily sensitive to air velocity along the beam path 210. There is no direct method for estimating horizontal wind velocity or direction from echoes along a single beam direction. Accordingly, the control component 221 can be configured to sequentially adjust the transmitted direction of beam 210 and the direction of maximized sensitivity to returned echoes. At least three beam directions are utilized to resolve horizontal wind speed, horizontal wind direction, and vertical wind speed.

In the example apparatus 200 in which the transducers 204 are used, the apparatus 200 transmits three beams inclined at approximately 11 degrees from a vertical reference 207 (FIG. 2D) in three directions separated by 120 degrees of azimuth. In one arrangement, the technique could be applied to other sodar apparatus, for example, without limitation, in which a single beam is transmitted more exactly vertically, and in which the second and third beam directions are inclined approximately 15 degrees from the vertical and separated from each other by approximately 90 degrees in azimuth.

By transmitting beams in three different directions, and estimating radial velocities in three different directions, vector analysis techniques can be applied to extract the horizontal wind speed and direction. It is also possible to transmit beams in more than three directions, the fourth and higher numbered beam directions providing redundant information which can be used to check and refine the accuracy of the wind speed estimate, although significantly similar benefits can be obtained from the simpler approach of taking a larger number of shots (i.e., a shot being a sound transmission and sampling of returned sound data) in just three beam directions.

The data from any individual shot is likely to be contaminated with noise, and at any particular altitude of interest there is no guarantee that the signal of interest will be of sufficient strength relative to the noise to be useful, or indeed to be detected at all. Accordingly, conventional sodar apparatus generally do not report near-instantaneous conditions based on a single group of three shots, which could be completed in roughly five seconds. Instead sodar apparatus typically report atmospheric conditions based on an average of a number of shots in each of the at least three directions. For example, data might be averaged over a ten minute interval, consisting of approximately one hundred shots in each of three directions.

Figure 2F:
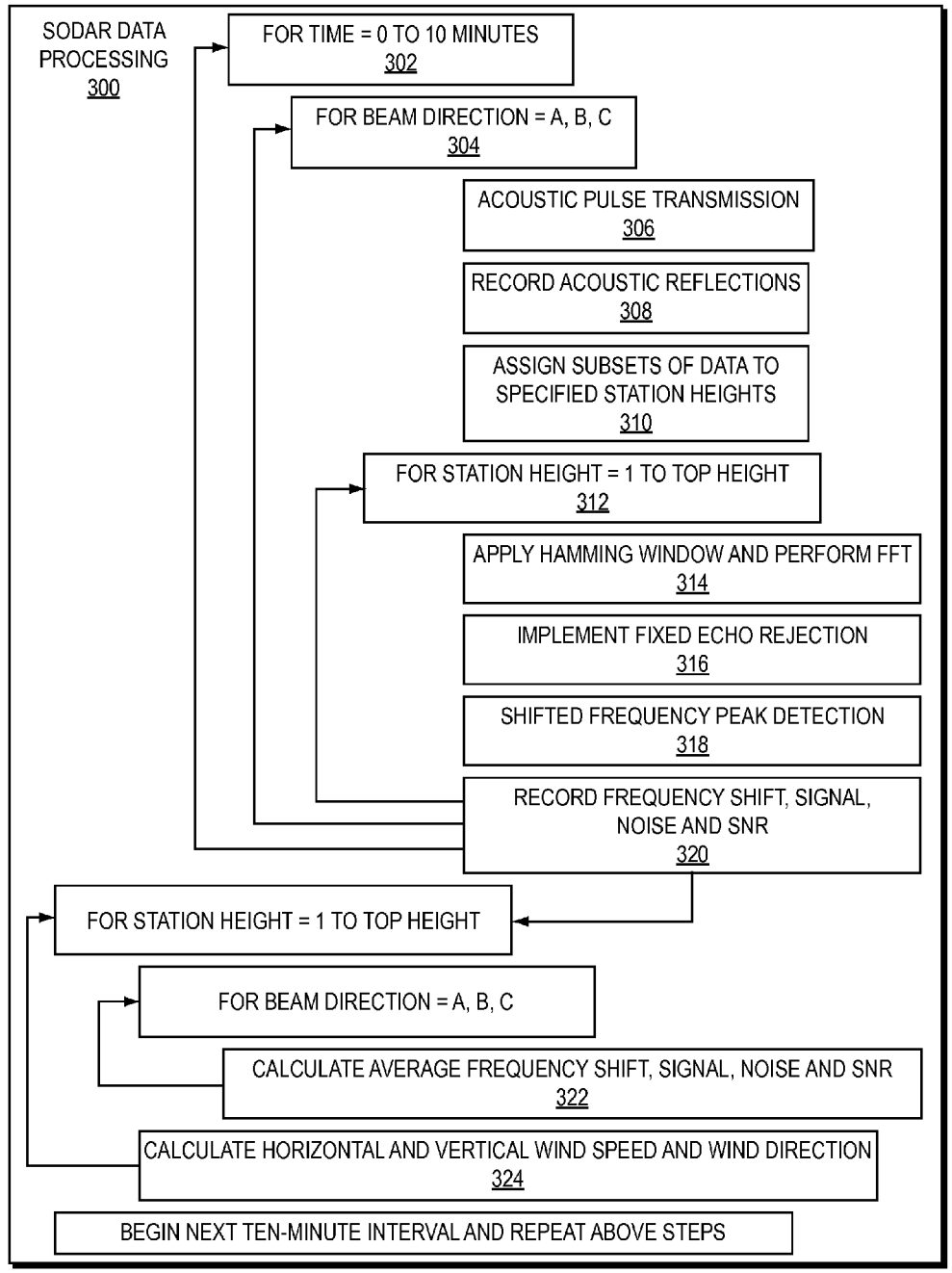
FIG. 2F is a flowchart showing a processing technique for a sodar apparatus.

FIG. 2F is a flowchart 300 that illustrates an example processing technique for a sodar apparatus 200, as described above. Sodar data is processed in blocks or durations of ten minutes 302, for example. During this period shots are repeated in each of three beam directions 304. As described above, for each direction, a directional acoustic pulse, or beam 210, is transmitted 306, and subsequently the apparatus 200 is configured to record the echoes, or acoustic reflections, from the environment 308.

Time of travel of the beam 210 to a particular altitude, and in turn the time of travel for any echo from that altitude to be returned to the apparatus, depends on the altitude and the speed of sound. Accordingly, as indicated at block 310, the returned signal can be broken up, or windowed, into segments associated with atmospheric conditions at different altitudes above the apparatus 200.

Subsequently, for each windowed segment 312, the sodar apparatus 200 applies a Fast Fourier Transform to this windowed data 314, to convert the time-series signal into the frequency domain so that Doppler shifts of the returned signals can be measured. For reasons known to those skilled in the art of such conversions, more accurate frequency spectra, without artifacts of the windowing process, will be obtained if some form of gradual windowing, for example a Hamming Window, is applied to the data than would be the case if abrupt or "boxcar" windowing were applied to the data.

The character of the resulting spectrum for an individual shot at a particular elevation can be summarized as a Doppler frequency shift, a signal level, and a signal-to-noise ratio (SNR). Techniques known to those skilled in the art can be used to eliminate the effect of zero-Doppler shift echoes returning from fixed objects 316. Doppler shifts can be computed for each beam direction at each elevation, as indicated in blocks 318, 320

Finally, after ten minutes have elapsed, an average Doppler shift for each beam direction can be computed at each elevation. The individual frequency shifts for the individual shots used in a particular average may be weighted in the average based on signal strength, noise strength, and SNR using conventional techniques (block 322). The average frequency shifts can be used to compute horizontal wind speed, direction, and vertical wind speed using conventional calculation methods (block 324).

Depending on atmospheric conditions, the absorptivity and reflectivity of the atmosphere to sound, and the presence of interfering noise sources, such as crickets, other insects, birds and man-made noise sources, a larger or smaller number of samples may be received sufficiently clearly to be analyzed. As the number of reliable samples received from a particular altitude falls, a point will be reached at which confidence in the data is no longer sufficient to provide a reliable estimate of wind speed at that altitude.

Another important source of interference for sodar apparatus 200 is the transmission of sound in a direction far from the intended axis, which may be reflected off of objects on the ground and returned to the apparatus. Due to the nature of the phased array process, "side lobes", or beams of sound directed roughly perpendicular to the intended main beam, are also emitted. The apparatus 200 emits much less sound in these near-horizontal directions, and is less sensitive to receiving sound from these directions. However, the comparatively better ability of solid objects to reflect sound, relative to the ability of atmospheric turbulence to reflect sound, often offsets this benefit, thereby resulting in received returns from stationary objects on the ground that can be relatively strong compared to the signals of interest.

Although such 'fixed echo' returns from objects on the ground generally come back without any Doppler shift, which allows their nature to be identified, it is not always possible to extract the Doppler shifted information from the atmosphere in the presence of the stronger fixed echo returns. Due to both real physical phenomena and mathematic limitations of the frequency measurement process, the return spectra from both the atmosphere and from fixed objects will appear spread into Gaussian curves in the frequency domain, rather than appearing as a sharp peak. Despite techniques such as those disclosed in co-pending application Ser. No. 12/748,141 entitled "Method Of Detecting And Compensating For Precipitation In Sodar Systems", filed on Mar. 5, 2010, the contents of which is incorporated herein by reference in its entirety, a point may be reached where the small peak of the signal of interest is lost in the tail of a much larger fixed echo peak.

Off-axis 'side lobe' emissions from the transducer array 202 can also propagate in complex ways, reflecting off of internal surfaces of the sodar apparatus 200 and perhaps also off of solid objects on the ground in the vicinity of the apparatus. Some of this energy may be dispersed into the atmosphere, reflected from moving air, and returned for detection by the apparatus as a Doppler shifted signal. In some cases, this energy may follow a path close enough to the main beam 210 such that the that the electronics package 205 combines the spectrum of the spurious return signal with the main return signal's spectrum, to introduce an error, or bias, into the latter which may go undetected.

It should be noted that anything which increases the absolute volume of the transmitted sound in the intended direction of the main beam will cause the returned signal from the atmosphere to be stronger relative to biologic and man-made noise sources not generated by the sodar apparatus 200, itself. It should also be noted that anything which increases the volume of the beam in the intended main beam direction relative to the volume in undesired off-axis or 'side lobe' directions will also improve the performance of the apparatus by reducing the impact of such off-axis emissions as discussed above.

As indicated above, the sodar apparatus 200 includes an array 200 having a set of individual transducers 204. In one arrangement, details of the transducer 204 are provided in FIGS. 3A through 3F. For example, as illustrated in FIGS. 3A through 3F, the transducer 204 includes a base 240, a horn 242 coupled to the base 240, and a central element 244 coupled to the horn 242.

The base 240, in one arrangement, includes electronic components configured to exchange signals with the electronics package 205 of the sodar apparatus 200. For example, with reference to FIG. 3D the base 240 can include a piezoelectric bimorph structure 246 configured to vibrate in response to received electrical signals, its deformation from a rest state being proportional to the voltage applied to its two flexible electrical lead wires 248. The lead wires 248, in one arrangement, are disposed in electrical communication with the electronics package 205 via a connector 252 mounted on a corresponding printed circuit board 254 associated with the base 240. The bimorph structure 246 can be secured, such as by an adhesive, to the apex of a conical transducer membrane 250. This conical membrane 250 is clamped around its perimeter between a clamping surface 253 associated with the horn 242 and a clamping surface 255 on a rear cap 256 of the base 240.

The operating frequency of the transducer 204 is relatively high compared to the inertial time constant of the spring mass system consisting of the mass of the bimorph structure 246, the elasticity in response to axial deflection of conical membrane 250. Accordingly, vibrations of the bimorph structure 246 are coupled into the conical surface of the conical transducer membrane 250. The vibrations of the membrane 250, in turn, induce pressure variations into the air within a cavity 260 between the rear surface of the horn 242 and the front face of membrane 250.

Figure 3A:
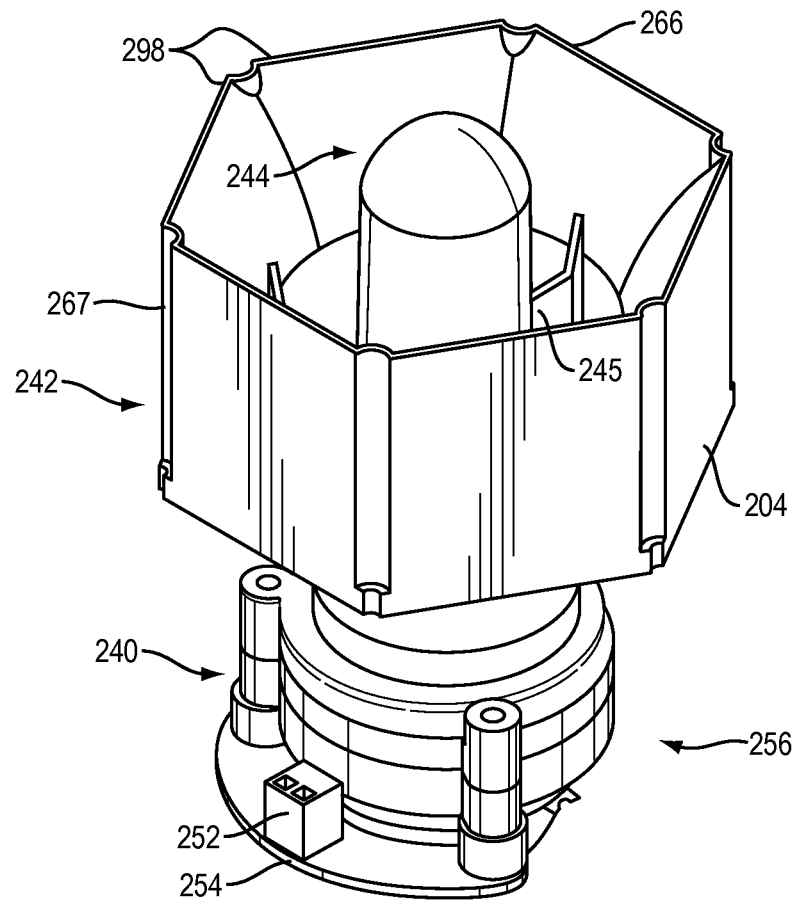
FIG. 3A illustrates a perspective view of a transducer, according to one arrangement.
Figure 3B:
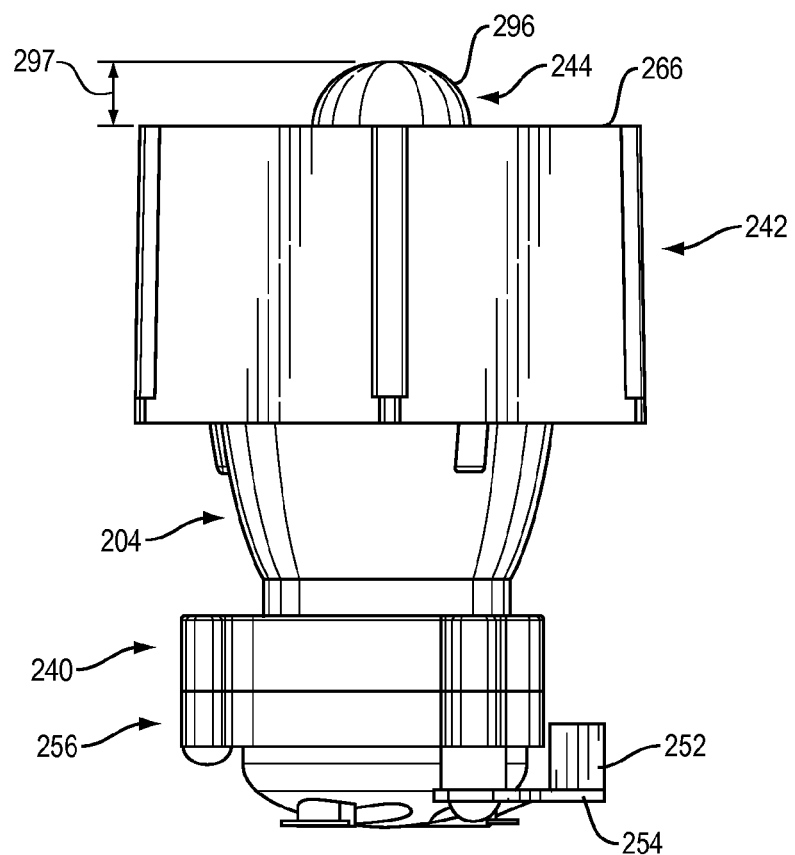
FIG. 3B illustrate a side view of the transducer of FIG. 3A.
Figure 3C:
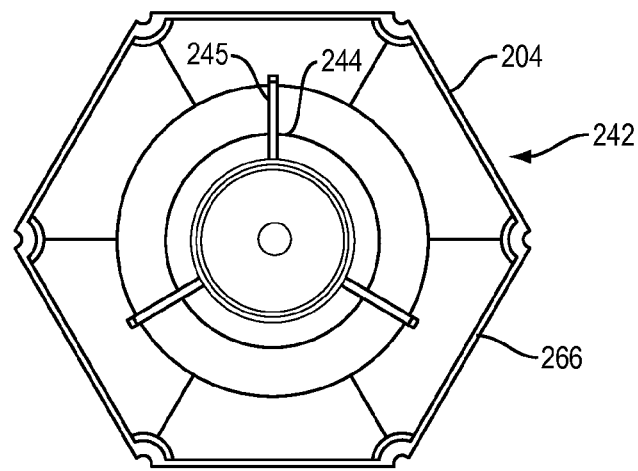
FIG. 3C illustrates a top view of the transducer of FIG. 3A.
Figure 3D:
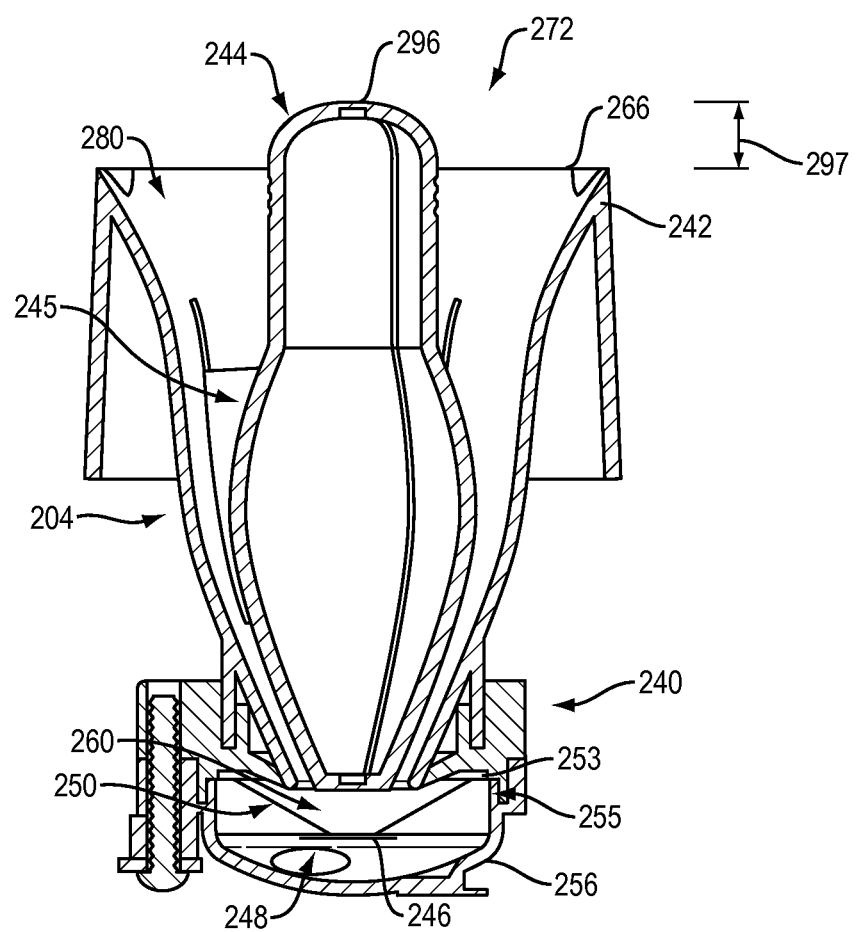
FIG. 3D illustrates a first side sectional of the transducer of FIG. 3A.
Figure 3E:
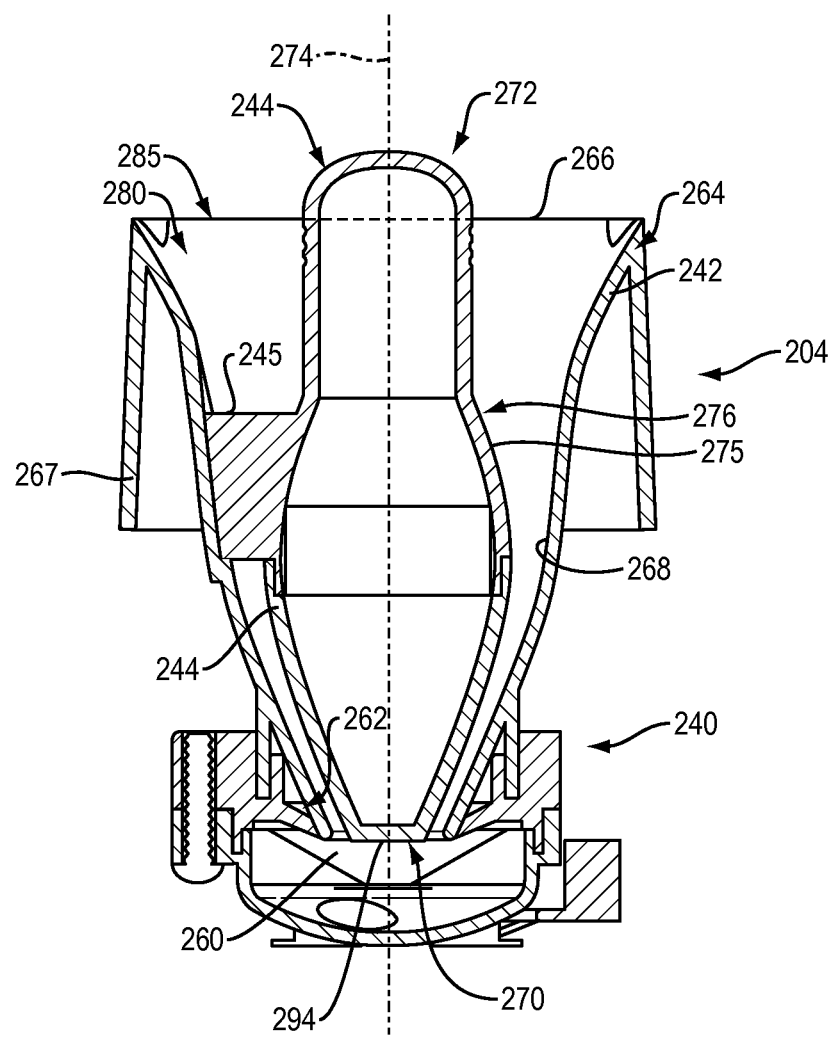
FIG. 3E illustrates a second side sectional of the transducer of FIG. 3A.
Figure 3F:
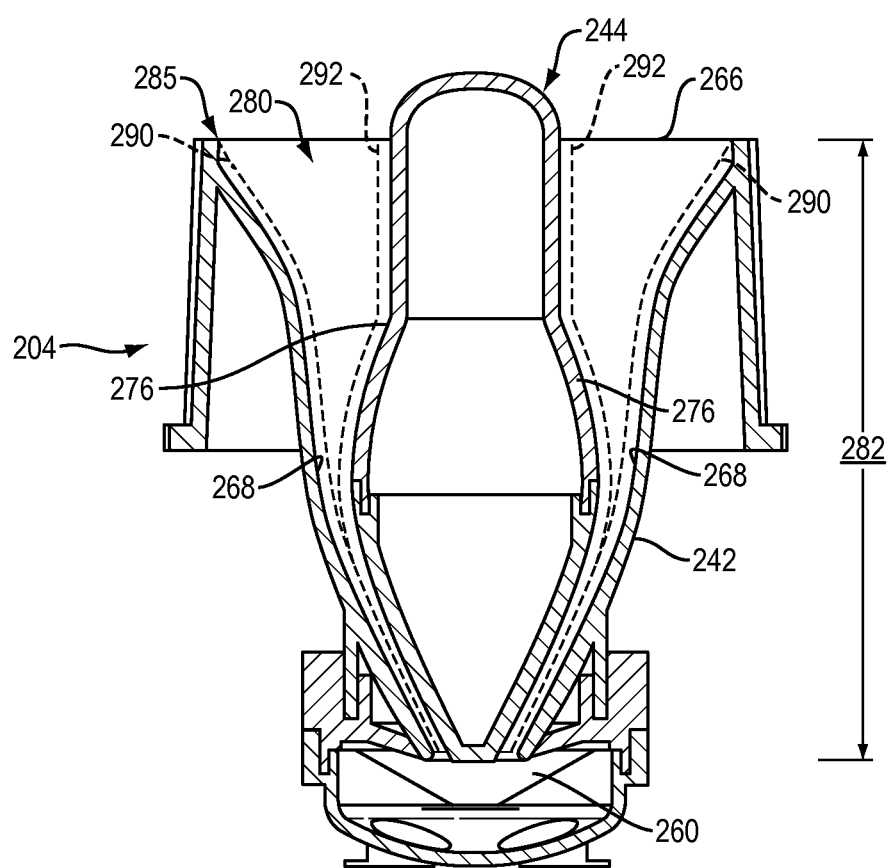
FIG. 3F illustrates a third side sectional of the transducer of FIG. 3A.

The horn 242 is configured to match the acoustic source impedance of the sound pressure in cavity 260 to the lower impedance of the free air outside of the transducer 204. The horn 242 is also configured to guide the emitted sound to the along a desired direction, as indicated in FIG. 3F. For example, with reference to FIG. 3E, the horn 242 includes a first end 262 coupled to the base 240 and a second end 264 extending from the base 240 and having a perimeter 266 that defines a substantially planar face of the transducer 204. The horn 242 also defines a horn length 268 along a horn surface between the first end 262 and the perimeter 266 of the horn 242. In one arrangement, the horn 242 includes a support member 267 that extends from the second end 264 of the horn 242, about the horn's perimeter 266, toward the base 240.

The central element 244 is also configured to guide emitted sound from the cavity 260 along a desired direction, as indicated in FIG. 3F. With reference to FIG. 3E, the central element 244 includes a first end 270 coupled to the base 240 and a second end 272 extending from the base 240 along a longitudinal axis 272 of the horn 242. The central element 244 defines a central element length 276 that extends along a central element surface between the first end 270 and the second end 272 of the central element 244. In one arrangement, the central element 244 is supported by a set of spoke support structures 245, such as a set of three spokes 245. The spokes 245 extend between the central element 244 and the horn 242 and do not substantially interfere with a path followed by sound generated or received by the transducer 204. The material that forms the spoke support structures 245 can be selected from a variety of materials.

As will be described below, the size and shape of the horn 242, the size and shape of the central element 244, and the size and shape of the cavity 280 defined between the horn and the central element 244 are optimized for the requirements of phased array operation and are configured to provide a wavefront having a substantially uniform phase at the substantially planar face of the transducer 204.

Figure 1A:
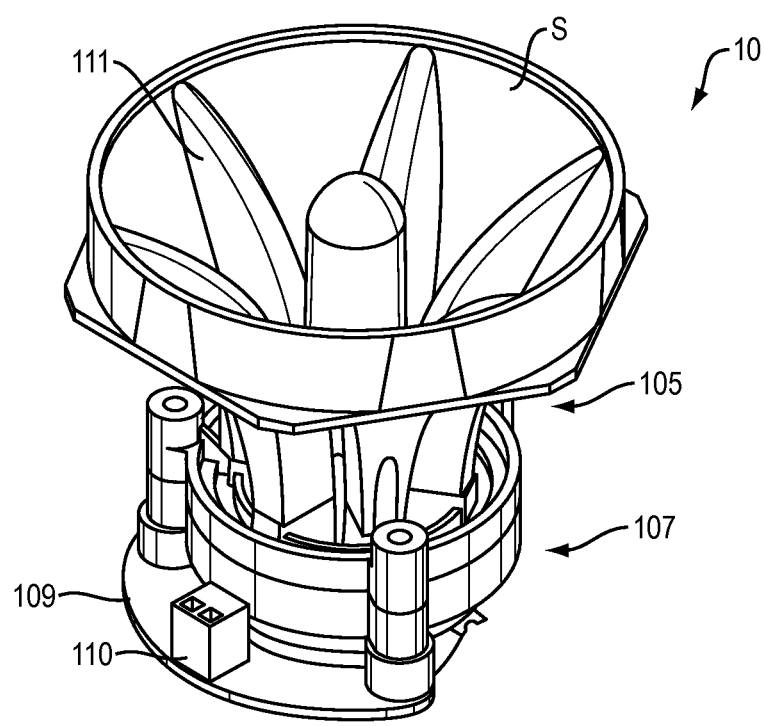
FIG. 1A illustrates a perspective view of a conventional transducer used in a sodar apparatus.
Figure 1B:
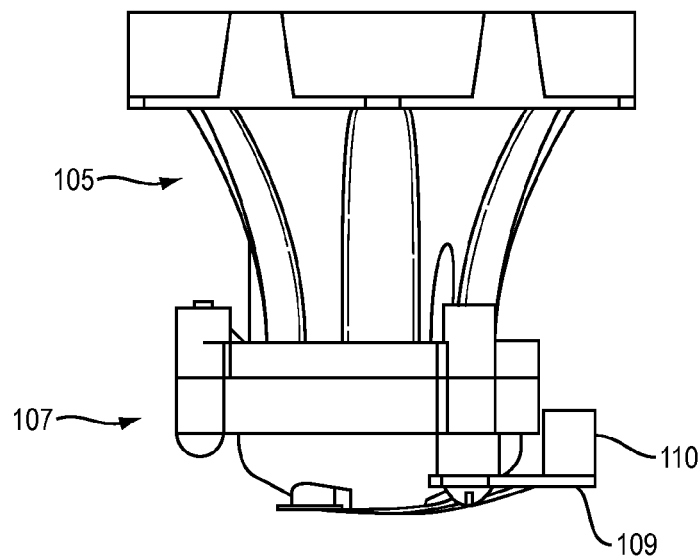
FIG. 1B illustrates a side view of the transducer of FIG. 1A.
Figure 1C:
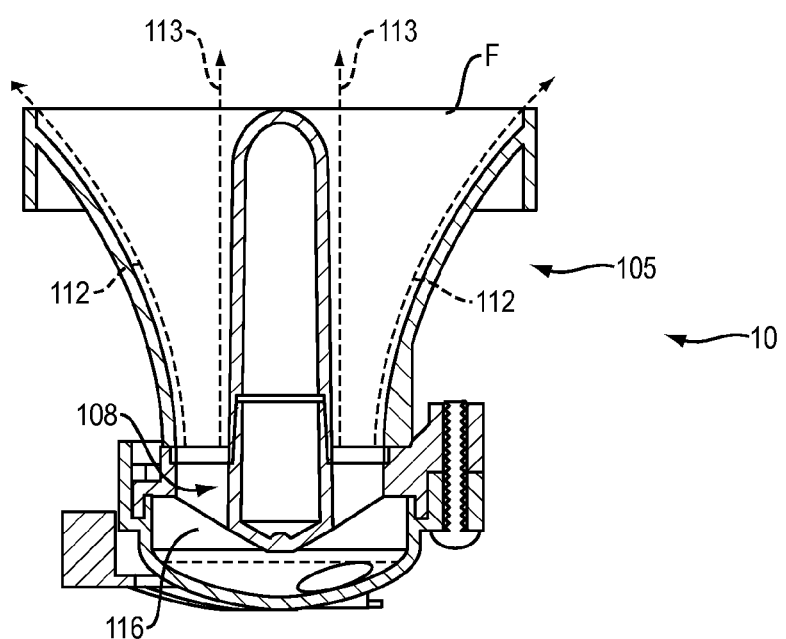
FIG. 1C illustrates a side sectional view of the transducer of FIG. 1A.

For example, the horn 242 is configured with a height 282 of about 3.5 inches. This relatively long horn height 282, compared to the relatively short horn length of about 2.25 inches found in conventional transducers, such as illustrated in FIGS. 1A through 1C, results in sound being emitted from the transducer 204 in a more unidirectional pattern.

In another example, the central element length 276 is configured as being substantially equal to the horn length 268. For example, with reference to FIG. 3E, the horn length 268 is about 3⅞ inches and the central element length 276 is between about 3⅝ inches and 4⅝ inches. With the central element length 276 being substantially equal to the horn length 268, the transducer 204 is configured to minimize variation in the phase of the sound arriving at various points on the planar emitting face of the transducer 204.

Figure 6:
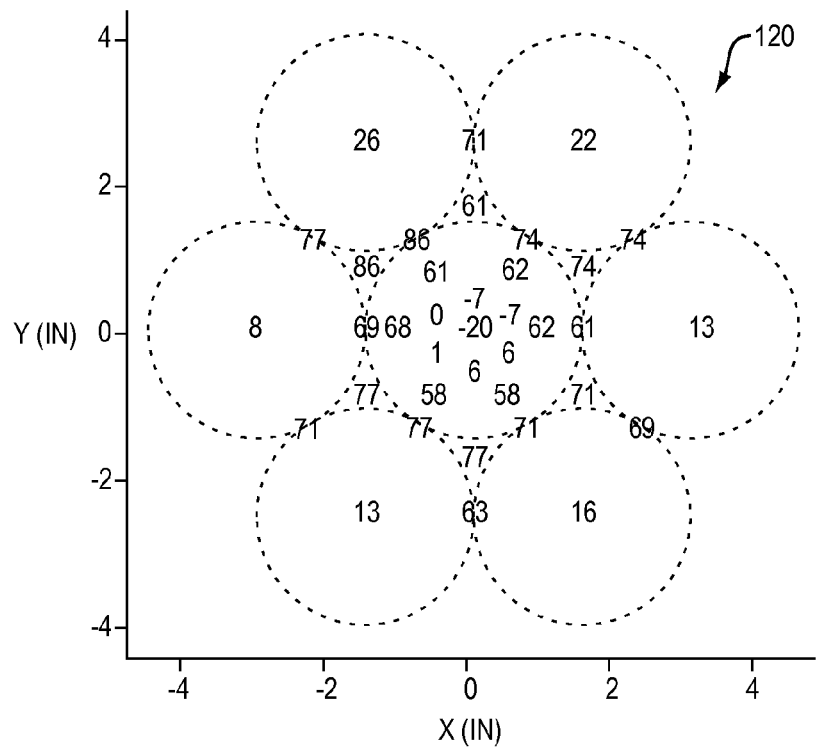
FIG. 6 is a plot, from data measured experimentally, of the variation in phase of the sound reaching the face of the horn of the transducer of FIG. 1A.
Figure 7:
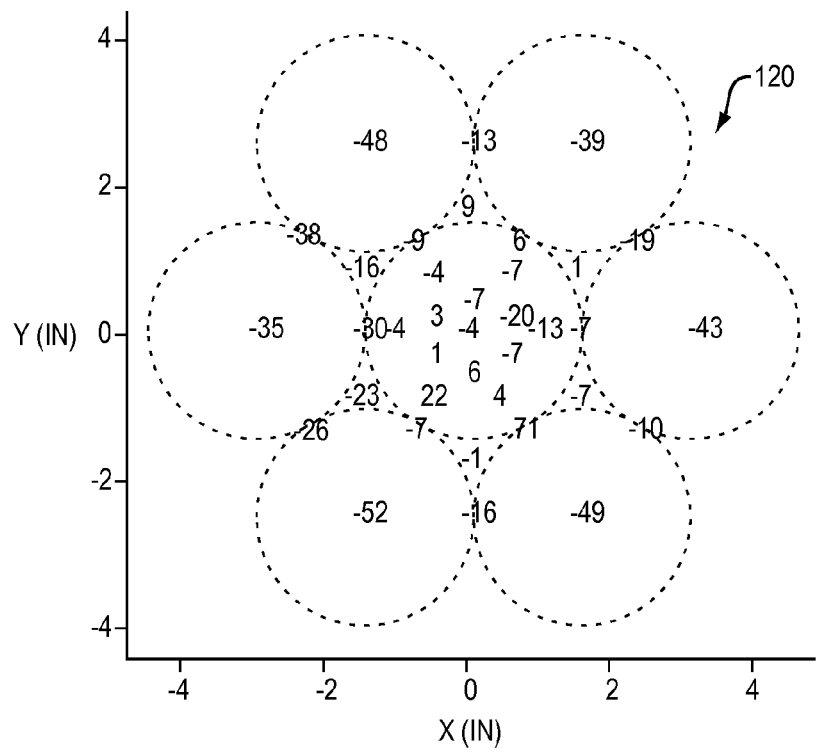
FIG. 7 is a plot of a substantially uniform phase of the sound reaching the face of the horn of the transducer of FIG. 3A.

For example, FIG. 3F shows a cross section of the transducer 204. Sound emitted from the perimeter 266 of the planar face 285 of the transducer 204 follows the horn inner surface 268, as indicated by a path dashed lines 290 and sound emitted from the central area of the transducer 204 follows the outer surface central element length 276, as indicated by a path of dashed lines 292. Because the length along surface 268 is configured as being substantially equal to the length 276 along the surface of central element 244, the path 290 of the horn length 268 is substantially equal to the path 292 of the central element length 276. As a result, the wavefront emitted from the entire face 285 of the transducer 204 will be substantially uniform in phase over the emitting planar face of the transducer 204, compared to conventional transducers 10 (e.g., the sound emitted from the periphery 266 of the transducer 204 has substantially the same phase angle as the sound emitted near a central portion of the transducer 204). For example, FIG. 6 shows phase measurements taken 2 inches above an array of transducer 10. The minimum phase in this configuration is −20 degrees and the maximum phase difference is +86 degrees, making a maximum phase difference of 106 degrees. FIG. 7 shows phase measurements taken 2 inches above an array of transducer 204. The minimum phase in this configuration is −30 degrees and the maximum phase difference is +22 degrees, constituting a smaller maximum phase difference of only 52 degrees.

In one arrangement, the shape of horn 242 and the shape of the central element 244 are configured to maximize sound emission in directions generally parallel to the axis 274 of the transducer 204 and to minimize sound emission along other, non-axial directions. For example, as illustrated in FIG. 3E, the horn 242 defines an S-shaped or sigmoid geometry relative to the longitudinal axis 274 as the horn 242 tapers outward from a center portion of the transducer 204 to the periphery 266. In another example, the central element 244 is configured with a substantially tapered first end 270, a substantially tapered second end 272, and a midsection 275 having a larger diameter than either the first end 20 or the second end 272. With such a geometric configuration of the horn 242 and the central element 244, the cross sectional area of the chamber 280, as defined between the horn 242 and central element 244 increases exponentially from the base 240 to the periphery 266 to maximize the efficiency of the transducer 204.

For applications such as a sodar where the phased array is operating at a single frequency, or a narrow range of frequencies, the efficiency of the transducer, and of the apparatus as a whole, can be maximized by setting the resonant, or natural, frequency of the transducer near to the operating frequency. Conventional transducers, such as transducers optimized for audio listening equipment, are designed with an operating frequency above the frequency range of interest. This results in lower, but fairly uniform, efficiency at all the operating frequencies which most faithfully reproduces signals, such as music, which occur over a wide range of frequencies.

With reference to FIG. 3E, the volume of cavity 260 can impact the resonant frequency of the transducer 204 as used in a sodar apparatus 200. In one arrangement, the central element 244 is configured to adjust the volume of the cavity 260 such that the resonant frequency of transducer 204 substantially matches the approximate operating frequency of the sodar apparatus 200. For example, the second end 270 of the central portion 244 defines a substantially V-shaped cross-section having a substantially flat central portion base 294 relative to the base 240. With such a configuration, the central portion 244 increases the volume of the cavity 260 to a volume of about 0.19 cubic inches, which is larger than the volume of conventional acoustic transducers (e.g., a conventional volume of about 0.03 cubic inches). Accordingly, the V-shaped cross-section and flat central portion base 294 maximize the efficiency of the transducer 204 at frequencies near to the operating frequency of the sodar apparatus 200. For example, the horn 242, the center portion 244, and the air cavity 260 as defined by second end 270, the entry of the horn 242 entry, and conical membrane 250 are together configured to vibrate at a resonant frequency of about 4,625 Hertz, which is substantially equal to the approximate 4,500 Hertz operating frequency of the sodar apparatus 200.

In one arrangement, the geometry of the central element 244 can be varied to enhance the operating characteristics of the transducer 204. For example, in one arrangement and with reference to FIGS. 3B and 3D, the central element 244 includes an extension portion 296 disposed at the second end 272 of the central element 244 where the extension portion 296 extends beyond the perimeter 266 of the horn 242. In one arrangement, the extension portion 296 extends at a distance 297 of about 0.375 inches beyond the perimeter 266 of the horn 242. With such a configuration, the central element 244 increases the amplitude of the waveform provided by the transducer 204 by about 0.42 dB and decreases the off-axis amplitude of the waveform provided by the transducer 204 by about 3.6 dB. While the extension portion 296 can be configured in a variety of ways, in one arrangement, the extension portion is configured with a substantially blunt of D-shaped cross section.

Returning to FIG. 3A, in one arrangement, the shape of the perimeter 266 of the active emitting face 285 of the transducer 204 is configured to maximize an active transmission area of an associated array 202 during operation. In one arrangement, the perimeter 266 of the horn 242 is configured as a consecutive series of substantially linear segments 298. For example, the perimeter 266 of the horn 242 can define a substantially hexagonal shape, as illustrated or can define a substantially triangular, rectangular, or square shape. When arranged as part of the array 202, the transducers 204 minimize discontinuities in the sound emitted from the surface of the array 202 as caused by interstitial areas within the array 202 relative to the individual transducers 204.

For example, FIG. 2A shows an array 100 of conventional transducers 10. Although the physical perimeter of transducers 10 are hexagonal, and tile with little gap, the active emitting planar face of transducer 10 is a circular shape, inscribed within the tiling hexagon. As a result, there are a plurality of generally triangular inactive areas 116 where the active areas meet, as shown in detail in FIG. 4B.

Figure 4A:
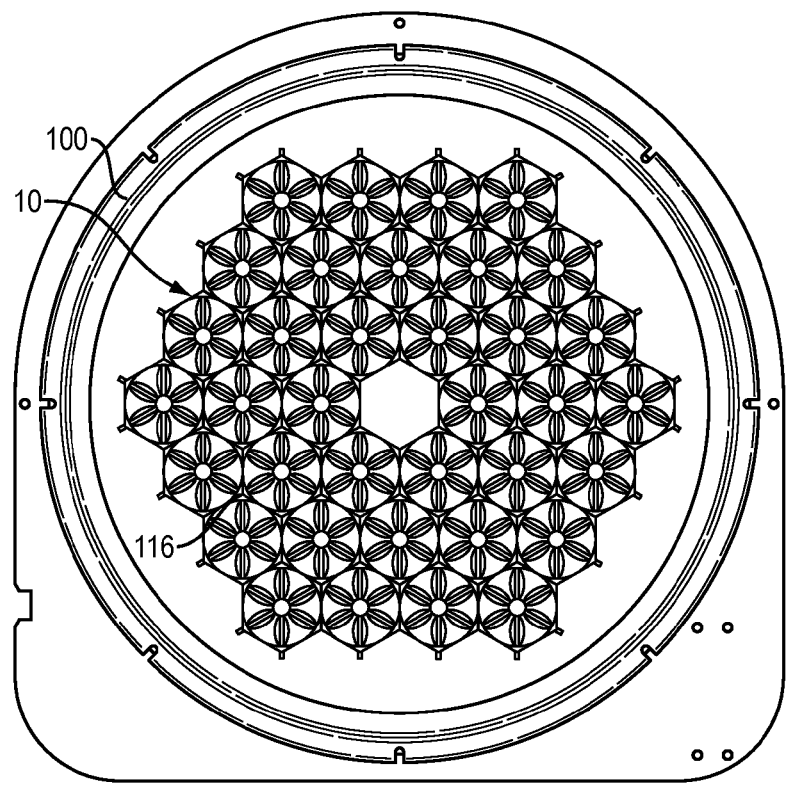
FIG. 4A shows a view of the transducer array assembly using a conventional transducer.
Figure 4B:
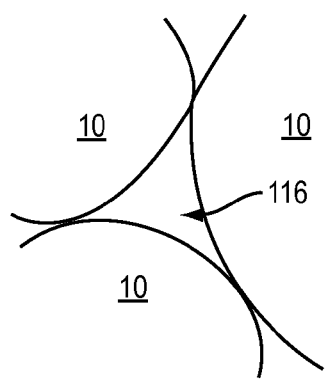
FIG. 4B illustrates an intersection portion of three transducers of the array of FIG. 4A.
Figure 4C:
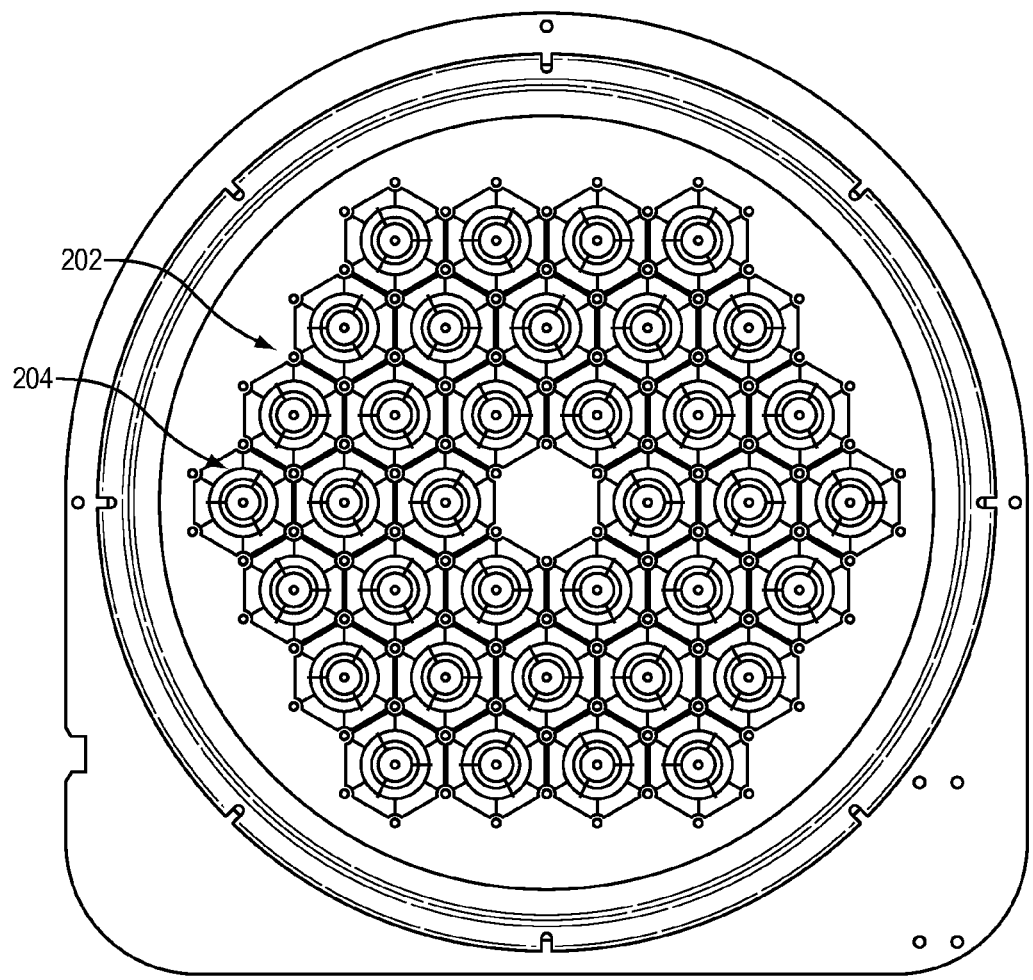
FIG. 4C shows a view of a transducer array using having transducers as shown in FIG. 3A.

By contrast, FIG. 4C shows the array 202 of transducers 204 where the transducers 204 are arranged in a closely packed geometry, such as a hexagonal arrangement of transducers having hexagonally shaped perimeters 266. The active emitting planar faces of the transducers 204 tile, essentially, without any gaps disposed between adjacent transducers 204 (i.e., the existing gaps being small holes provided for assembly hardware that fastens transducers 204 into the supporting structure for the array 202). By eliminating the inactive areas in the array 204, the emission of undesirable off axis energy by the array 203 is minimized. Accordingly, the emitted sound beam will be relatively more intense along a desired axis, and undesired spurious emissions in other directions will be minimized.

Figure 5A:
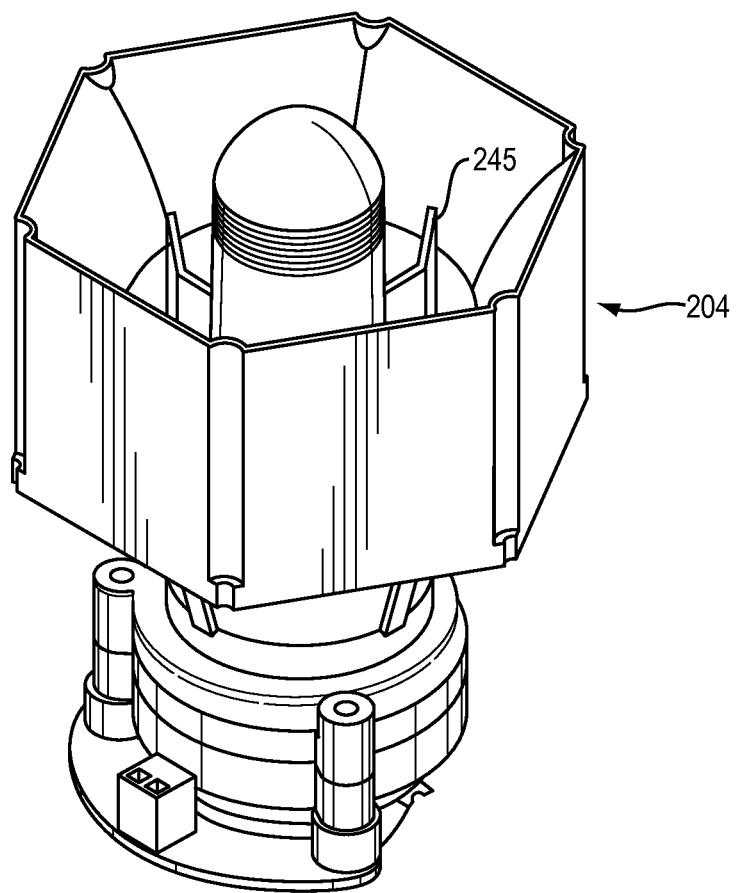
FIG. 5A illustrates a perspective view of a transducer, according to one arrangement.
Figure 5B:
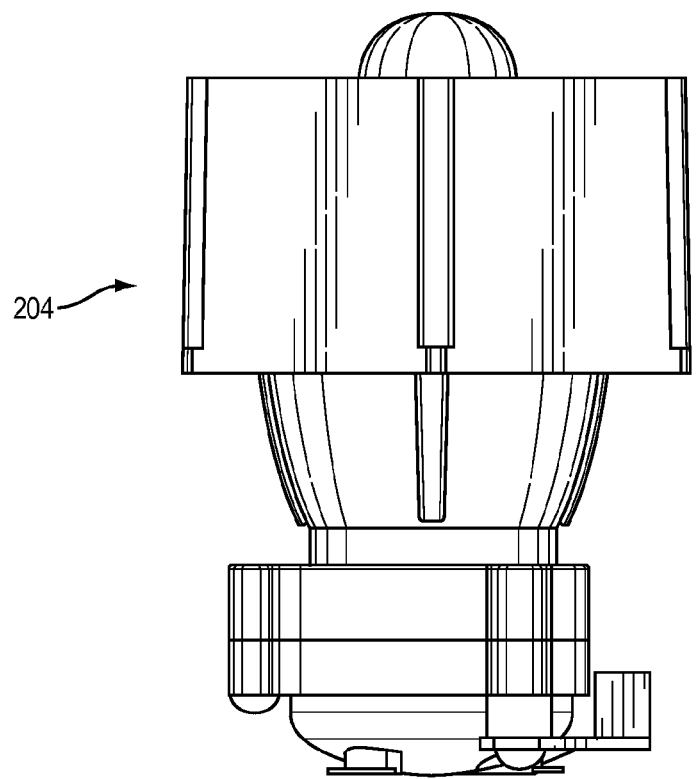
FIG. 5B illustrate a side view of the transducer of FIG. 5A.
Figure 5C:
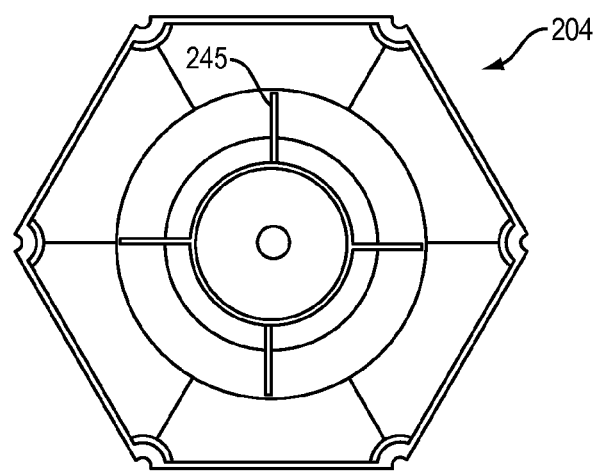
FIG. 5C illustrates a top view of the transducer of FIG. 5A.
Figure 5D:
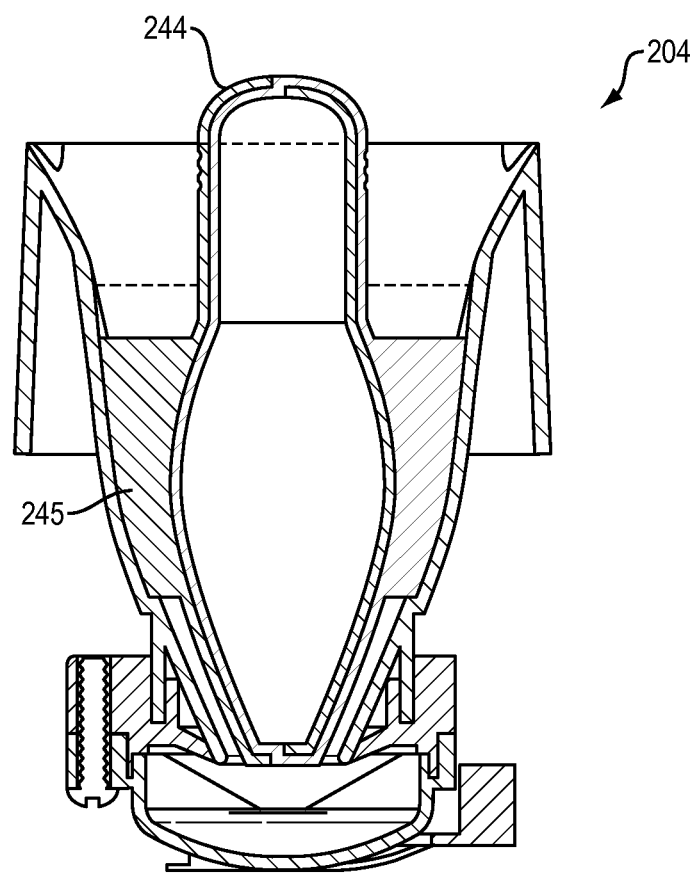
FIG. 5D illustrates a first side sectional of the transducer of FIG. 5A.
Figure 5E:
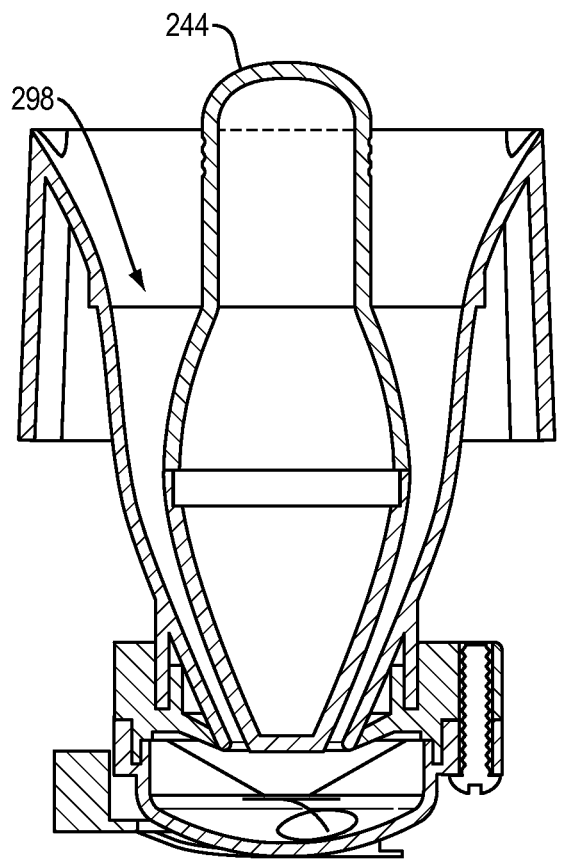
FIG. 5E illustrates a second side sectional of the transducer of FIG. 5A.

As indicated above, central element supported by three spokes 245. Such description is by way of example only. Any number of spokes 245 can be used. For example, FIGS. 5A, 5B, 5C, and 5D show another arrangement of the transducer 204 where four spokes 245 are used. It will be apparent that other numbers of spokes, including just one relatively heavier spoke, could be used. For another example, as is shown in FIG. 5E, the central element 244 can be supported by a perforated sheet element 298. In one arrangement, the perforations in sheet 298 are sufficient so as not to introduce significant obstruction to the propagation of the sound, and the thickness and material strength of sheet 298 is sufficient to adequately support central element 244.

The following provides a description of experimental data that compares and contrasts the operation of a transducer 204 relative to the operation of a conventional transducer 10 as illustrated in FIGS. 1A through 1C.

FIG. 6 shows experimental data illustrating the phase of the sound emitted from the planar emitting face of a conventional transducer 10. The transducer under test is assembled as the central transducer in a small array consisting of seven transducers. Dashed circles 120 in the figure indicate the position of the seven transducers 10 in the array 100. All the transducers 10 in this array 100 were driven with a single test signal of uniform phase. The purpose of the experiment was to measure the phase of the single central speaker. However, the sound emission characteristics of a single transducer 10, measured over various locations of its emitting face are significantly affected by the presence of adjacent emitting transducers 10.

FIG. 7 shows experimental data illustrating the phase of the sound emitted from the planar emitting face of transducer 204. Note that although the perimeter of the active area of the transducer 204 includes a series of substantially linear segments (e.g., the transducer 204 defines a hexagonal shape for example), it is shown as circular in FIG. 7 only for the sake of direct comparison to FIG. 6.

It is apparent from the data shown in FIGS. 6 and 7 that the sound emitted from the transducer 204 is significantly more uniform in phase than that of the conventional transducer 10. For the conventional transducer 10, the phase measurements vary from a minimum of −20 to a maximum of +86 degrees. The phase of the sound as emitted from various parts of the hexagonal area in the array occupied by the conventional transducer 10 varies over a range of 106 degrees. For the transducer 204, the phase measurements vary from a minimum of −30 to a maximum of +22 degrees. In this case of the range of phase variation is smaller, being 52 degrees. The majority of the measurements on the transducer 204 fall in a smaller range.

Figure 8A:
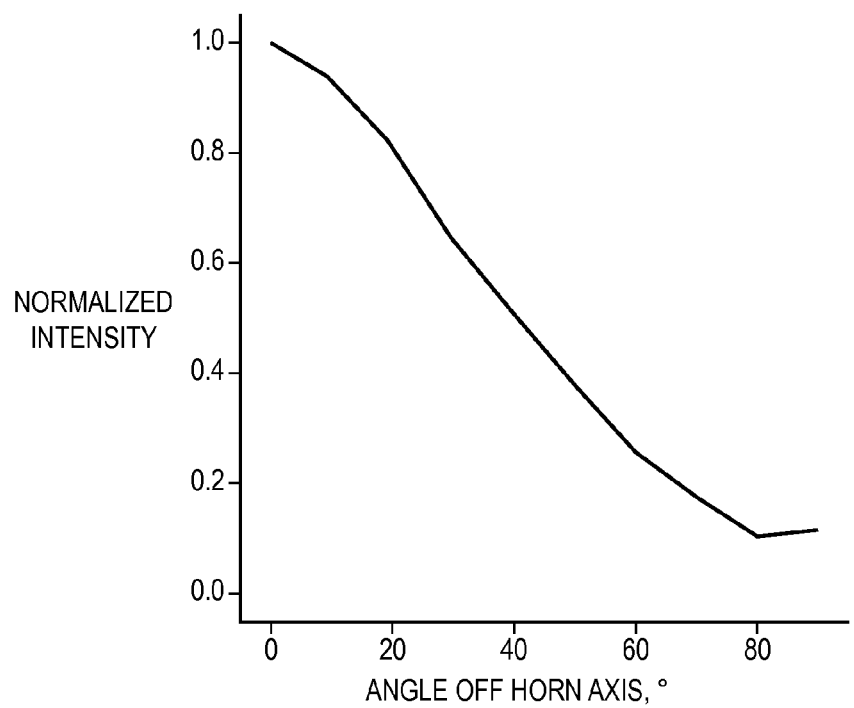
FIG. 8A is a plot, from data measured experimentally, of the variation in sound intensity as a function of angle off the horn axis for a transducer of FIG. 1A.

FIG. 8A shows experimentally measured data from a conventional transducer 10 showing the intensity of the sound emitted as a function of angle in degrees off of the centerline axis of the transducer. The data is normalized to an intensity of 1.0 at the centerline axis of the transducer 10.

Figure 8B:
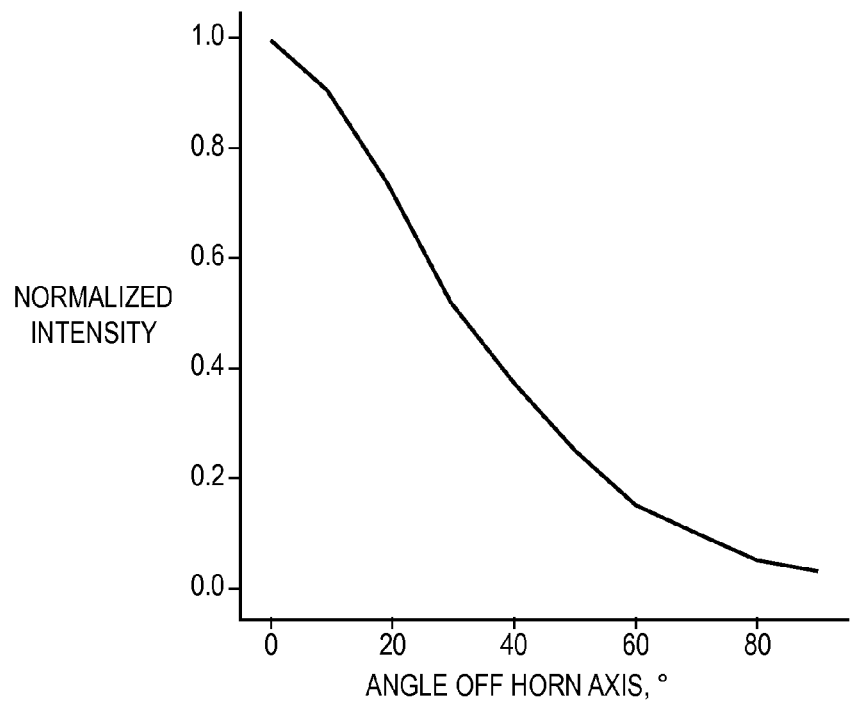
FIG. 8B is a similar plot of the variation in sound intensity as a function of angle off the horn axis for a single transducer of FIG. 3A.

FIG. 8B shows similar experimentally measured data for the transducer 204.

As discussed above, a high ratio between main lobe desired sound emissions and undesirable side lobe emissions is important to the performance of phased array systems. The emissions from an array 100 in desired and undesired directions are directly influenced by the intensity of emission from the individual transducers 10 within the array 100. The side lobe emissions from conventional transducer 10 are approximately 19 dB quieter than the intensity in the on-axis desired direction. The side lobe emissions of the transducer 204 are approximately 26 dB quieter than the intensity in the desired direction. As a result, the ratio between main lobe intensity and side lobe intensity of an array constructed from the transducers 204 will be roughly two times better than the same ratio for an array 100 constructed using conventional transducers 10 for this reason alone, and without considering additional improvements resulting from other modified characteristics of the transducer 204.

Figure 8C:
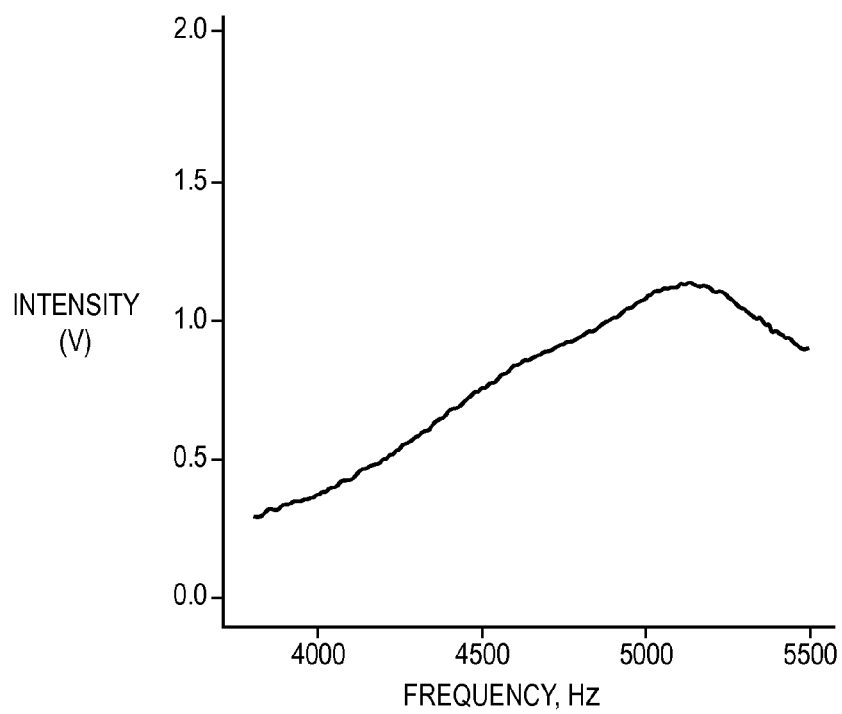
FIG. 8C is a plot, from data measured experimentally of the sound intensity as a function of operating frequency for a transducer of FIG. 1A.

FIG. 8C shows a plot of experimentally measured sound intensity of the conventional transducer 10 for electrical input signals of uniform amplitude and varying frequencies. The intensity of the sound being in arbitrary units of voltage output from a test microphone. At the desired operating frequency, the conventional transducer 10 has a sound intensity of approximately 0.75 microphone output volts.

Figure 8D:
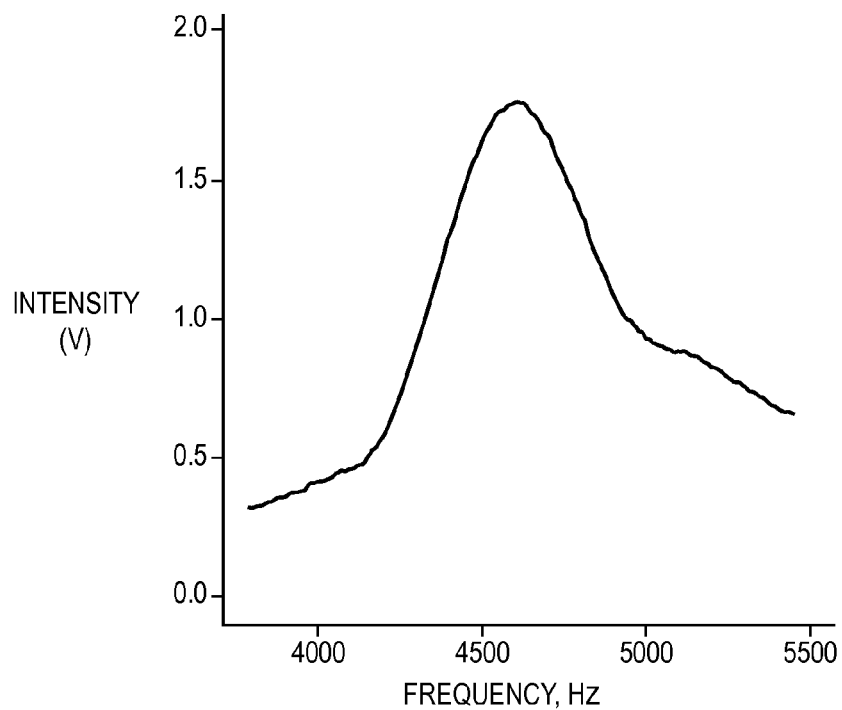
FIG. 8D is a similar plot for a single transducer of FIG. 3A.

FIG. 8D shows a similar plot for the intensity of the transducer 204, driven by the same uniform amplitude electrical signal of varying frequency and using the same microphone system to measure sound output. At the desired operating frequency, the transducer 204 has a sound intensity of approximately 1.6 microphone output volts.

For a given input voltage to a transducer at the desired frequency of about 4,500 Hz, the transducer 204 is approximately 6.5 dB louder than a conventional transducer 10.

Figure 9A:
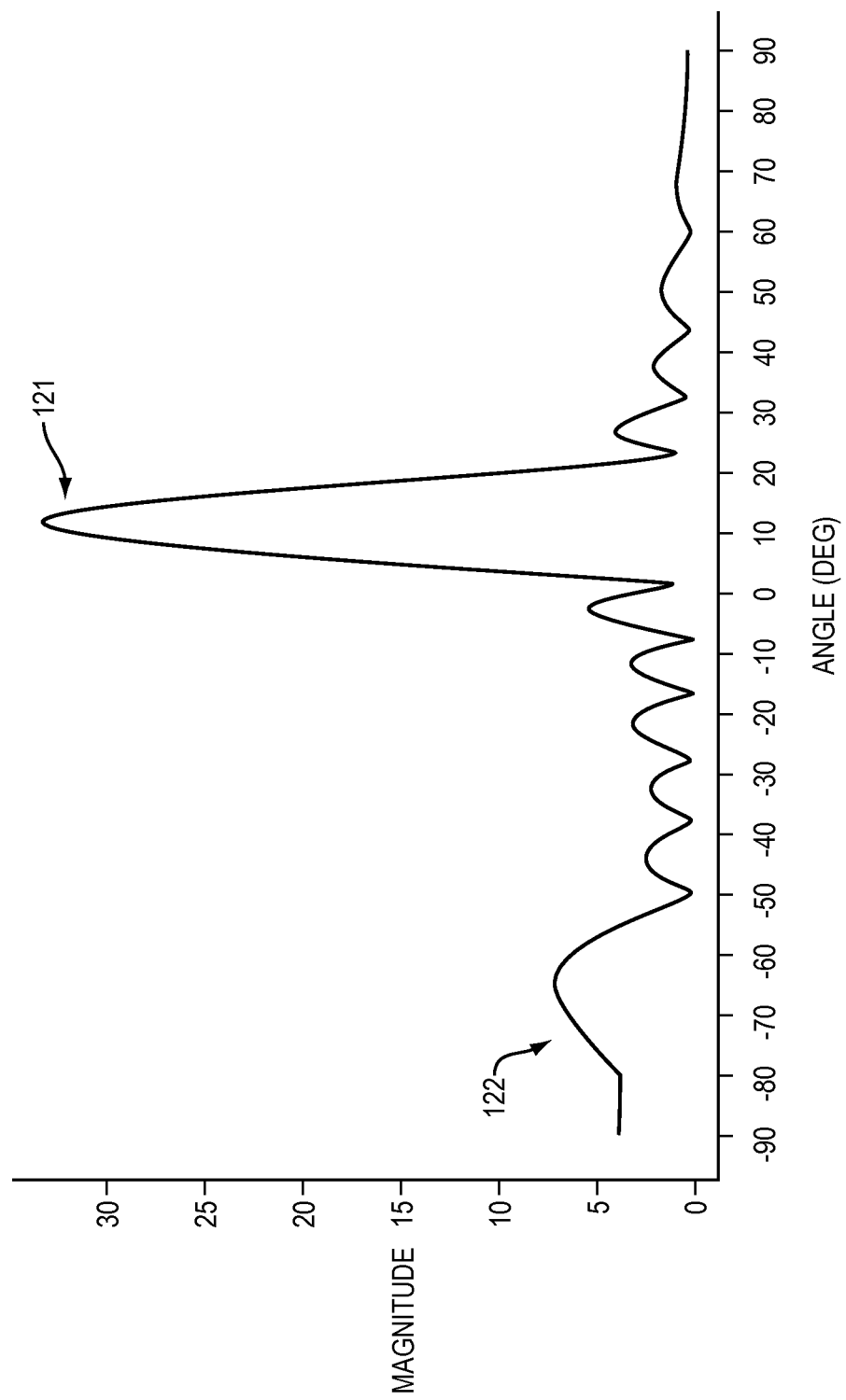
FIG. 9A is a plot, based on theoretic modeling, of signal strength versus emissions angle for an array made up of transducers of FIG. 1A.

FIG. 9A shows a theoretical prediction of sound intensity as a function of angle off the centerline of the phased array 100, using conventional transducer 10. In this figure, the intended beam angle is 11 degrees, and the phasing of the theoretical model of the several individual transducers 10 is adjusted so as to produce a main beam 121 emitted at this desired 11 degree angle. In this model, the sound emission from each of the individual transducers 10 is modeled as a point source, the emission pattern of that source being shown in FIG. 8B. This model is a reasonable approximation of an array having transducers 10 which do not have uniform phase of transmission and which do not tile into the phased array 100 without triangular inactive areas 116 as shown in FIG. 4B. In this model, the intensity of the undesirable side lobe 122 at about ninety degrees off axis is approximately 14 dB quieter than the intensity of the desired main beam.

Figure 9B:
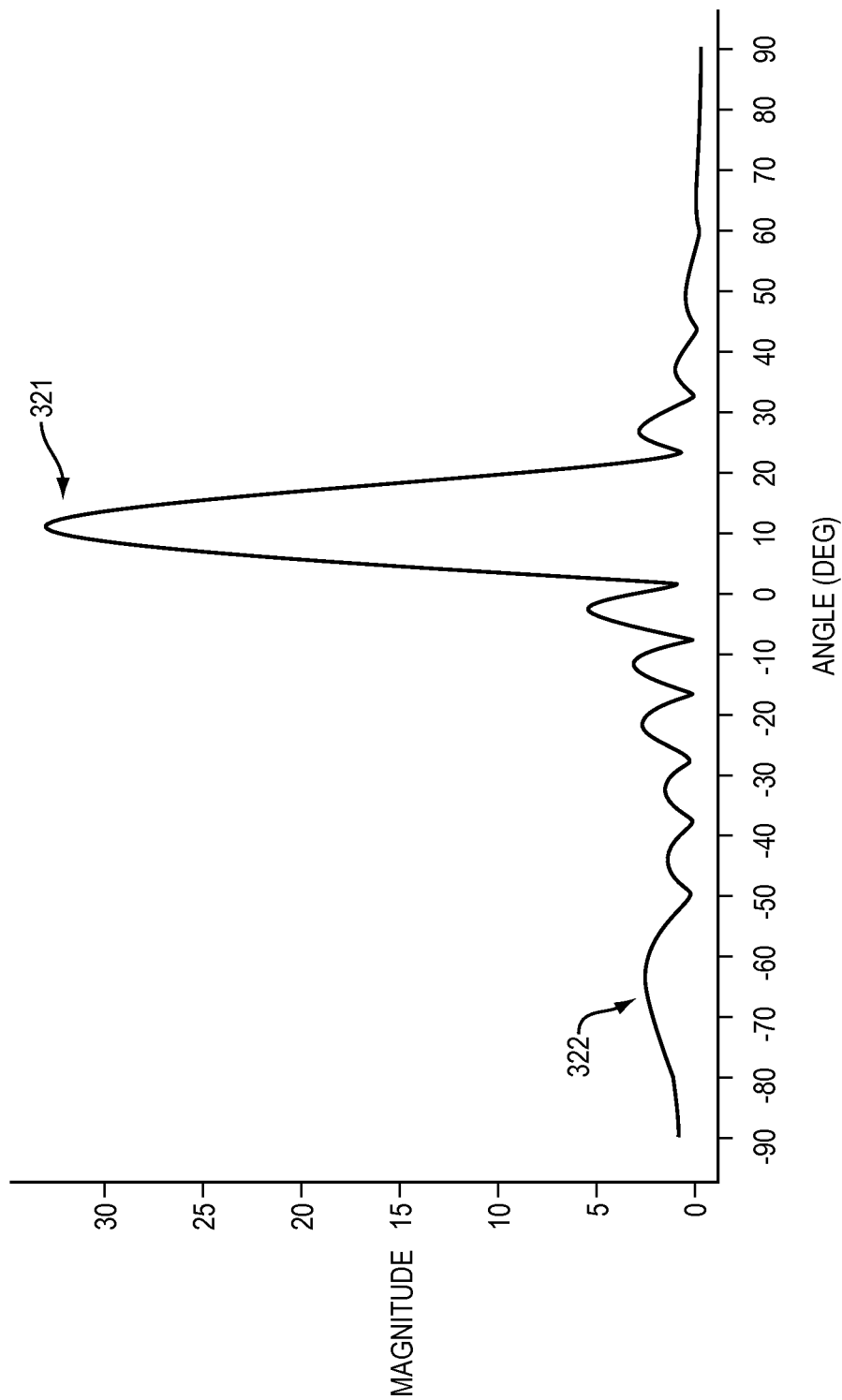
FIG. 9B is a plot, based on theoretic modeling, of signal strength versus emissions angle for an array made up of transducers of FIG. 3A

FIG. 9B shows a theoretical prediction where the sound emission from each of the transducers 204 is modeled as a number of point sources spread over the active area of the transducer. The model used to generate the FIG. 9B data being otherwise identical to the model used to generate the data shown in FIG. 9A. The alternate model used in FIG. 9B provides a reasonable approximation of an array constructed of transducers 204 having the phase uniformity and superior tiling fit properties of the preferred embodiment transducers. In this model, the intensity of the undesirable side lobe 322 is approximately 22 dB quieter than the intensity of the desired main beam 321. This lower side lobe intensity is more desirable than the side lobe intensity shown in FIG. 9A by a factor of 2.33.

Figure 10A:
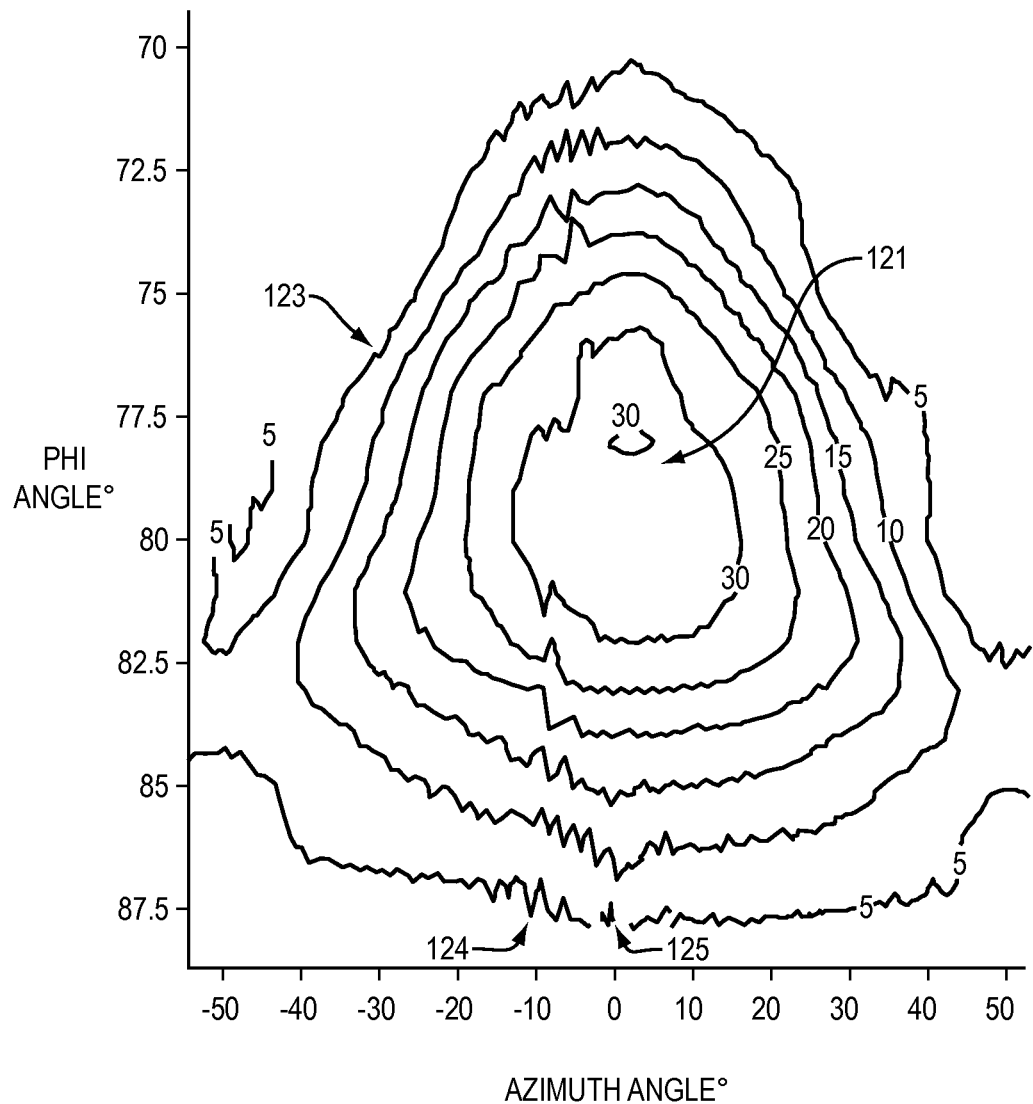
FIG. 10A is a plot, from data measured experimentally, showing a contour map of signal strength versus position for the main portion of the beam for an array made up of transducers of FIG. 1A.

FIG. 10A shows a plot of the main beam emission pattern of an array 100 constructed of conventional transducers 10 mounted into a complete sodar apparatus, including housing. This emission pattern was measured using an experimental apparatus consisting of an array of microphones mounted on a movable structure above the sodar apparatus, and controlled by an experimental computer which collected signal intensity data for a number of different points above the sodar apparatus. This data was then post processed so as to generate the plot shown where curves 123 represent contours of equal signal intensity over position. Jagged sections 124 and gaps 125 in these curves are artifacts resulting from imperfections in the data collection and post processing techniques, and not indicative of real performance characteristics of the apparatus. The printed numbers aligned with each of the several curves 123 indicate the intensity of the signal in arbitrary units. From this data, it is apparent that the central portion of the desired main beam 121 has an intensity of approximately 30 in the arbitrary units.

Figure 10B:
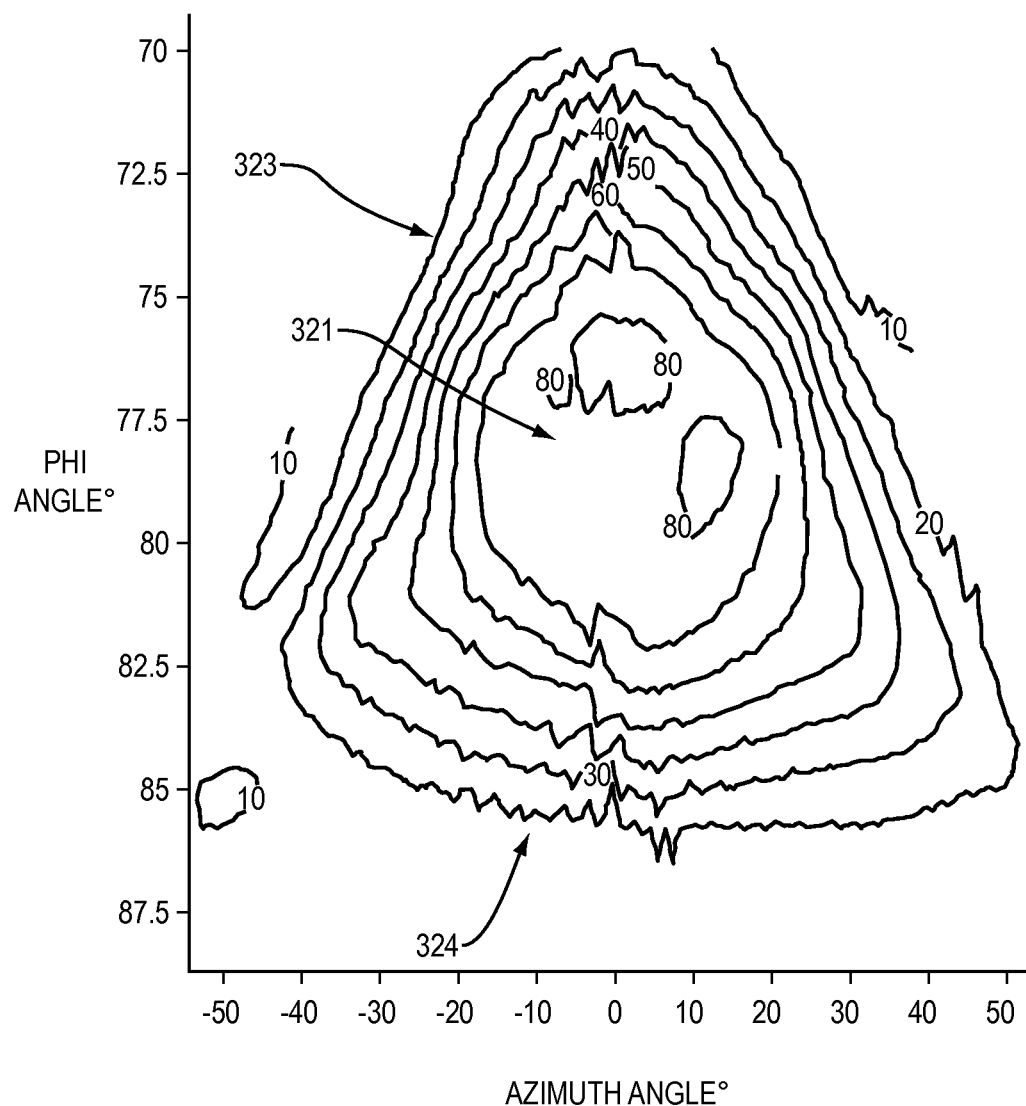
FIG. 10B is a similar plot showing a contour map of signal strength versus position for the main portion of the beam for an array made up of transducers of FIG. 3A.

FIG. 10B shows a similar plot where transducers 204 are used, the sodar apparatus 200 and the experimental method being otherwise substantially identical. In this data, it is apparent that the desired main beam 321 has an intensity of approximately 75 in arbitrary units. This constitutes an 8 dB increase from the transducers 10 to transducers 204.

Figure 11A:
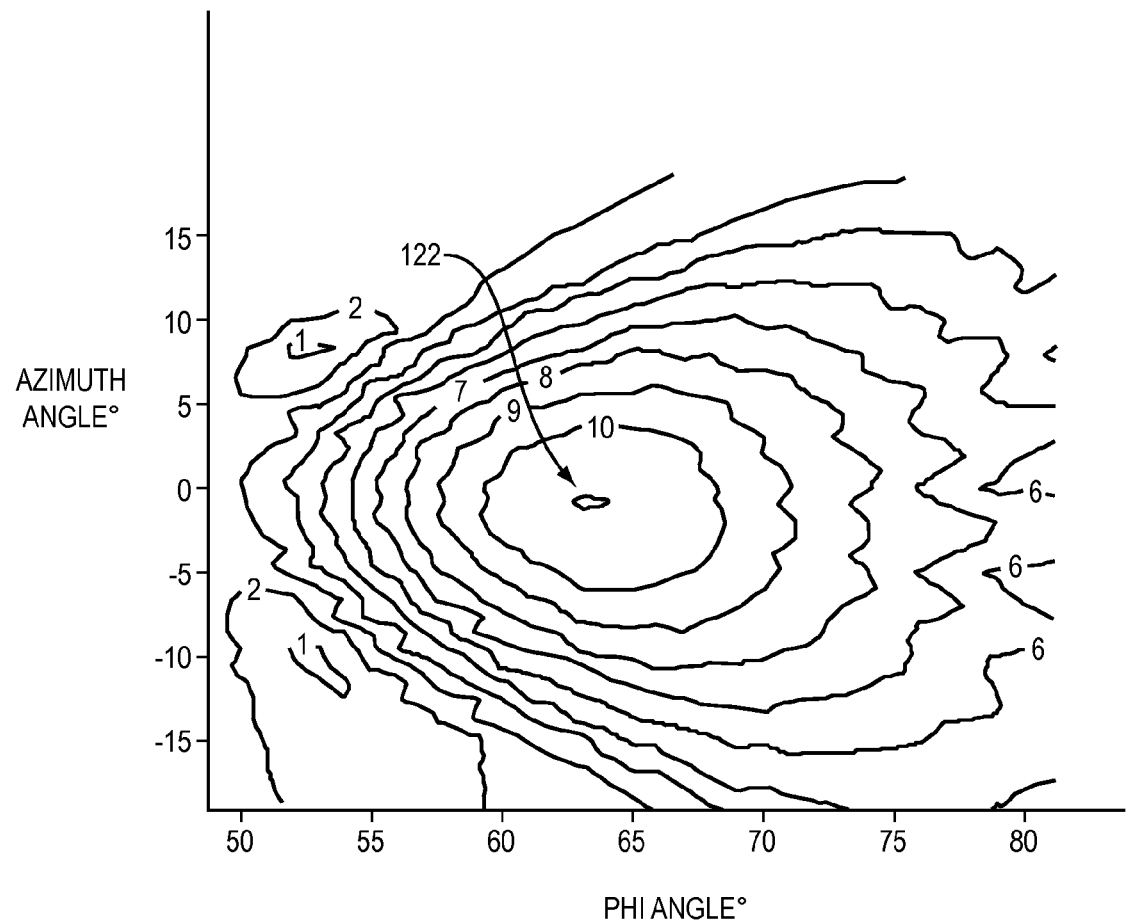
FIG. 11A is a plot, from data measured experimentally showing a contour map of signal strength versus position for the off-axis or side-lobe emissions of an array made up of transducers of FIG. 1A.

FIG. 11A shows similar contour plot of the undesirable side lobe 122 for an array of conventional transducers 10. Enclosure 200 can be configured to attenuate undesirable side lobe beam 122. To distinguish the impact of the transducer 204 from the impact of the enclosure 200 measurements related to the side lobe beam 122 were made without enclosure 200 surrounding the transducer array. For this array, using conventional transducers 10, the intensity of side lobe beam 122 was approximately 10 in arbitrary units. This is approximately 9.6 dB quieter than the main beam 121 for the array using conventional transducers as shown in FIG. 10A.

Figure 11B:
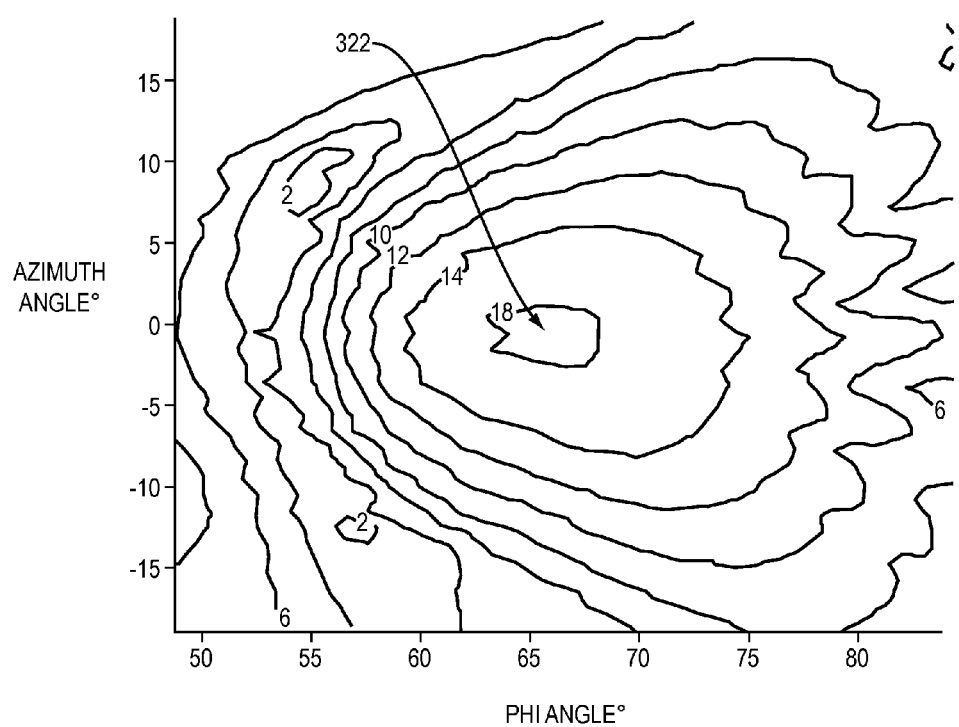
FIG. 11B is a similar plot showing a contour map of signal strength versus position for the off-axis emissions of an array made up of transducers of FIG. 3A.

FIG. 11B shows data similar to the data shown in FIG. 11A, the only difference being that the array 202 was assembled using transducers 204. In this case the intensity of the undesirable side lobe beam 322 is approximately 16 in arbitrary units. The intensity of this beam is greater in absolute terms than the beam produced by the conventional transducers as shown in FIG. 11A, but this greater intensity is due to the overall greater intensity of the transducers 204. The intensity of this side lobe beam 322 is approximately 13.5 dB quieter than the intensity of the main lobe beam 121 for the array using the transducers 204 shown in FIG. 10B. For the purposes of the sodar apparatus, the ratio of main beam 121 to side lobe beam 122 is of importance, not the absolute intensity of the side lobe beam. Measured by this criterion, the side lobe 322 using the transducers 204 is approximately 1.57 times less relatively intense than the side lobe 122 from the conventional transducers 10.

In all the foregoing discussion, and in the data presented in FIGS. 6 through 12, the performance of arrangements of a transducer 204 as a speaker, that is, as a device to convert electrical input to sound output, has been discussed. It will be apparent to one skilled in the art of acoustic transducers that the transducer 204 can have similarly improved performance relative to the conventional transducer 10 in efficiency, directionality, and phase uniformity when operated as a microphone, that is, as a device to convert sound input to electrical output. It will be further apparent to one skilled in the art that the improvement to the operation of a phased array using the transducer 204 when being operated as a microphone receive array will be similar to the benefits described in detail above when operated as a speaker transmission array, and that these two benefits can combine to form an even greater overall benefit.

Figure 12A:
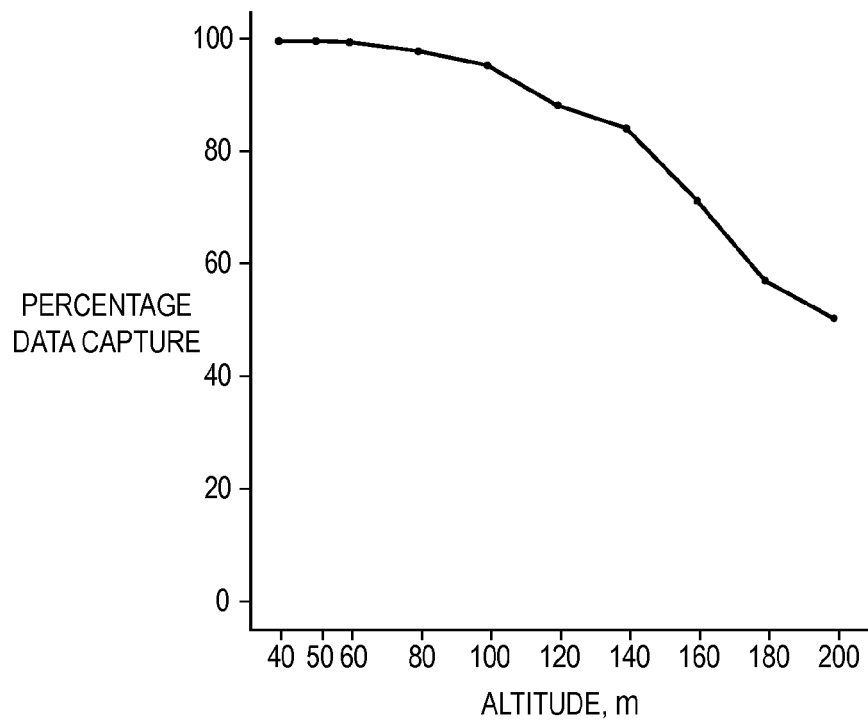
FIG. 12A is a plot of percentage data capture versus altitude for a sodar apparatus using the transducers of FIG. 1A at a typical measurement site.
Figure 12B:
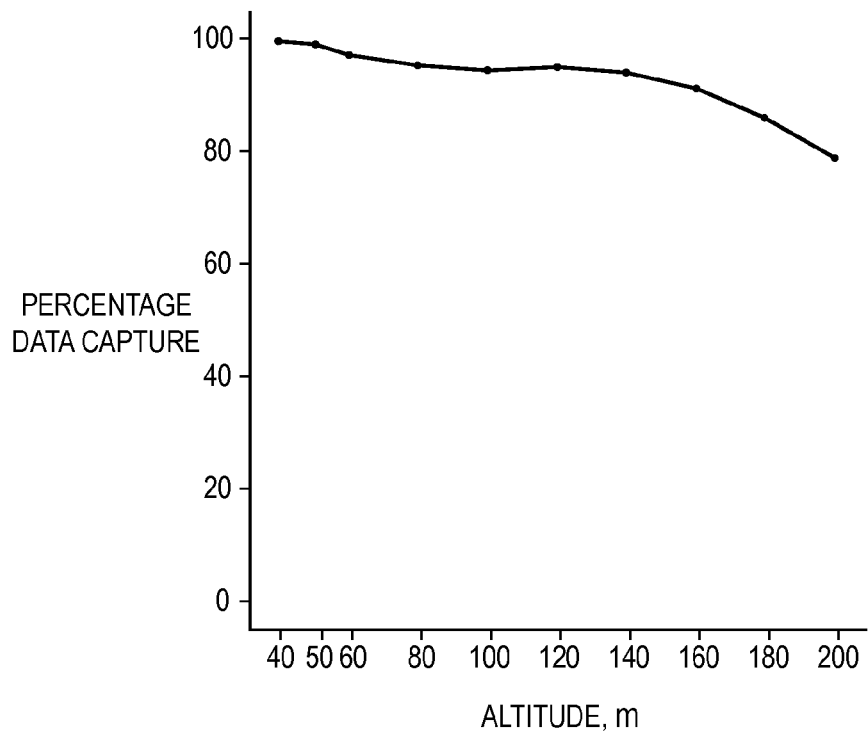
FIG. 12B is the same information for a sodar apparatus using the transducers of FIG. 3A at the same site and the same time period.

FIG. 12A shows the percentage data capture versus altitude for a sodar apparatus using conventional transducers 10 operating at a field test site. FIG. 12B shows the same data for an otherwise identical sodar apparatus 200 using transducers 204 operating at the same site. It is difficult if not impossible for two sodar apparatus to be operated simultaneously at the same site, since the sound from one apparatus will interfere with the operation of the other. But performance of a sodar apparatus is highly dependent on the acoustic and atmospheric conditions at the time and place where it is operating. In order to make a valid comparison, the units were configured so that the apparatus with the transducers 204 would operate for two minutes, followed by the apparatus with conventional transducers 10 for two minutes, each unit operating in turn until a statistically significant number of samples was obtained.

Figure 12C:
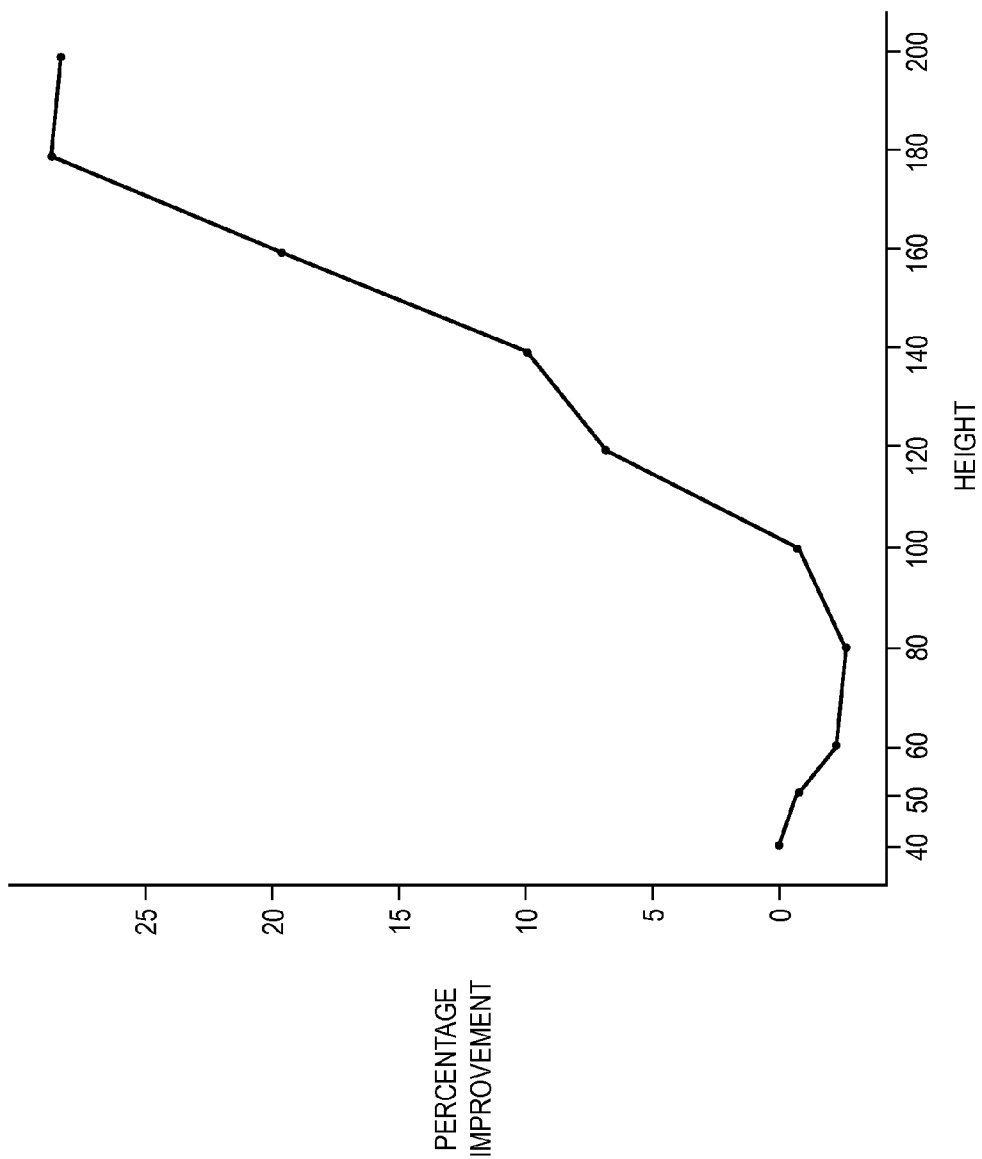
FIG. 12C is the percentage increase in data capture for the transducers of FIG. 3A versus altitude for the data sets of FIGS. 12A and 12B.

FIG. 12C shows that the two apparatus are substantially similar in performance at lower altitudes. Both apparatus capture over 95% of the data up to an altitude of 100 meters. At higher altitudes the transducer 204 performs consistently and significantly better than the conventional transducer 10. For example, with respect to performance at altitudes 120 through 160 meters the transducer 204 apparatus performed at above 90% data capture, while the conventional transducer apparatus did not. Performance above 90% data capture at these altitudes is important to the applications in wind resource assessment for which the apparatus is designed, as these altitudes cover the entire swept area of most wind turbines.

While various embodiments of the innovation have been particularly shown and described, it will be understood by those skilled in the art that various changes in form and details may be made therein without departing from the spirit and scope of the innovation as defined by the appended claims.

For example, as indicated above the transducer 204 is utilized as part of a sodar apparatus. Such indication is by way of example only. In one arrangement, the transducer can be used in other arrays, in other housings, in other sodar systems, and in applications other than sodar.

What is claimed is:

1. A transducer, comprising:
   a base;
   a horn having a first end coupled to the base and a second end extending from the base and having a perimeter that defines a substantially planar face of the transducer, the horn defining a horn surface length along a horn surface path between the first end and the second end of the horn; and
   a central element having a first end coupled to the horn and a second end extending from the base along a longitudinal axis of the horn, the central element defining a central element surface length along a central element surface path between the first end and the second end of the central element, the central element surface length being substantially equal to the horn surface length.

2. The transducer of claim 1, wherein the horn surface length and the central element surface length are configured to provide a wavefront having a substantially uniform phase at the substantially planar face of the transducer.

3. The transducer of claim 1, wherein:
   the horn surface length is between about 3 inches and 4 inches; and
   the central element surface length is between about 3⅞ inches and 4⅞ inches.

4. The transducer of claim 1, wherein the horn defines a height of about 3.5 inches between the first end and the second end.

5. The transducer of claim 1, wherein the central element further comprises an extension portion disposed at the second end of the central element, the extension portion extending beyond the perimeter of the horn.

6. The transducer of claim 5, wherein the extension portion defines a substantially D-shaped cross-section.

7. The transducer of claim 1, wherein the second end of the central portion defines a substantially V-shaped cross-section having a substantially flat central portion base relative to the base.

8. The transducer of claim 7, wherein the horn and the center portion are configured so that the transducer has a resonant frequency of about 4.5 kilohertz.

9. The transducer of claim 1, wherein the perimeter of the horn is configured as a consecutive series of substantially linear segments.

10. The transducer of claim 9, wherein the perimeter of the horn defines a substantially hexagonal shape.

11. The transducer of claim 9, wherein the perimeter of the horn defines a substantially rectangular shape.

12. A sodar apparatus, comprising:
    a housing;
    a set of transducers carried by the housing, at least one transducer of the set of transducers comprising:
       a base;
       a horn having a first end coupled to the base and a second end extending from the base and having a perimeter that defines a substantially planar face of the transducer, the horn defining a horn surface length along a horn surface path between the first end and the second end of the horn; and
       a central element having a first end coupled to the horn and a second end extending from the base along a longitudinal axis of the horn, the central element defining a central element surface length along a central element surface path between the first end and the second end of the central element, the central element surface length being substantially equal to the horn surface length.

13. The sodar apparatus of claim 12, wherein the horn surface length and the central element surface length are configured to provide a wavefront having a substantially uniform phase at the substantially planar face of the transducer.

14. The sodar apparatus of claim 12, wherein:
    the horn surface length is between about 3 inches and 4 inches; and
    the central element surface length is between about 3⅞ inches and 4⅞ inches.

15. The sodar apparatus of claim 12, wherein the horn defines a height of about 3.5 inches between the first end and the second end.

16. The sodar apparatus of claim 12, wherein the central element further comprises an extension portion disposed at the second end of the central element, the extension portion extending beyond the perimeter of the horn.

17. The sodar apparatus of claim 16, wherein the extension portion defines a substantially D-shaped cross-section.

18. The sodar apparatus of claim 12, wherein the second end of the central portion defines a substantially V-shaped cross-section having a substantially flat central portion base relative to the base.

19. The sodar apparatus of claim 18, wherein the horn and the center portion are configured so that the transducer has a resonant frequency of about 4.5 kilohertz.

20. The sodar apparatus of claim 12, wherein the perimeter of the horn is configured as a consecutive series of substantially linear segments.

21. The transducer of claim 1, wherein the cross sectional area of a chamber defined between the central element and the horn increases exponentially from the first end to the second end.

* * * * *